(12) United States Patent
Doty, III et al.

(10) Patent No.: US 7,930,989 B2
(45) Date of Patent: Apr. 26, 2011

(54) BIRD REPELLER AND METHOD OF ASSEMBLY

(75) Inventors: Arthur F. Doty, III, Edisto Island, SC (US); Robert M. Turkewitz, Charleston, SC (US); Erik S. Olson, Charleston, SC (US); Paul D. Spies, Mt. Pleasant, SC (US)

(73) Assignee: Robert M. Turkewitz, Charleston, SC (US)

( * ) Notice: Subject to any disclaimer, the term of this patent is extended or adjusted under 35 U.S.C. 154(b) by 187 days.

(21) Appl. No.: 12/446,862

(22) PCT Filed: Oct. 2, 2007

(86) PCT No.: PCT/US2007/080188
§ 371 (c)(1),
(2), (4) Date: Apr. 23, 2009

(87) PCT Pub. No.: WO2008/051685
PCT Pub. Date: May 2, 2008

(65) Prior Publication Data
US 2010/0236470 A1    Sep. 23, 2010

Related U.S. Application Data

(60) Provisional application No. 60/854,335, filed on Oct. 25, 2006.

(51) Int. Cl.
*A01M 29/00*    (2011.01)
*A01M 29/02*    (2006.01)
*G09F 19/12*    (2006.01)

(52) U.S. Cl. .................. 116/22 A; 40/412; 446/218
(58) Field of Classification Search .............. 116/22 A; 40/124.19, 412, 422, 439, 440, 441, 602; 43/1, 2; 446/210, 217, 218
See application file for complete search history.

(56) References Cited

U.S. PATENT DOCUMENTS

| | | | | |
|---|---|---|---|---|
| 1,380,325 A * | 5/1921 | Schlirf | ................ | 446/218 |
| 2,575,252 A | 11/1951 | Berger | | |
| 3,786,583 A * | 1/1974 | Revor | ................ | 40/479 |
| 3,983,653 A * | 10/1976 | Paige | ................ | 446/210 |
| 4,656,770 A | 4/1987 | Nuttle | | |
| 5,343,651 A | 9/1994 | Chatten | | |
| 5,452,536 A | 9/1995 | Chatten | | |
| 6,363,637 B1 * | 4/2002 | Birmingham | ............ | 40/440 |
| 6,742,470 B2 | 6/2004 | Keithly | | |
| 6,814,021 B1 | 11/2004 | Turkewitz et al. | | |
| 7,156,044 B1 * | 1/2007 | Davis | ................ | 116/28 R |
| 7,255,060 B2 * | 8/2007 | Grandy | ................ | 116/22 A |
| 7,549,248 B1 * | 6/2009 | Luster | ................ | 43/2 |

* cited by examiner

*Primary Examiner* — R. A. Smith
(74) *Attorney, Agent, or Firm* — Townsend M. Belser, Jr.; Nexsen Pruet, LLC

(57) ABSTRACT

Assembly for repelling birds from a selected area and method of making it. A rotor is assembled from a plurality of identical fin panels and rotatably mounted on a supporting pole within the selected area. Graphic designs comprising bird scaring holographic and/or diffractive images may be placed on the pole and/or rotor to simulate movement even when the rotor is stationary. The fin panels may be transparent and reflective to project light beams between and away from rotor surfaces. Outwardly projecting fin segments and a rotor barrel with vents are responsive to wind currents to rotate the rotor and generate bird repelling noises and visual effects.

26 Claims, 15 Drawing Sheets

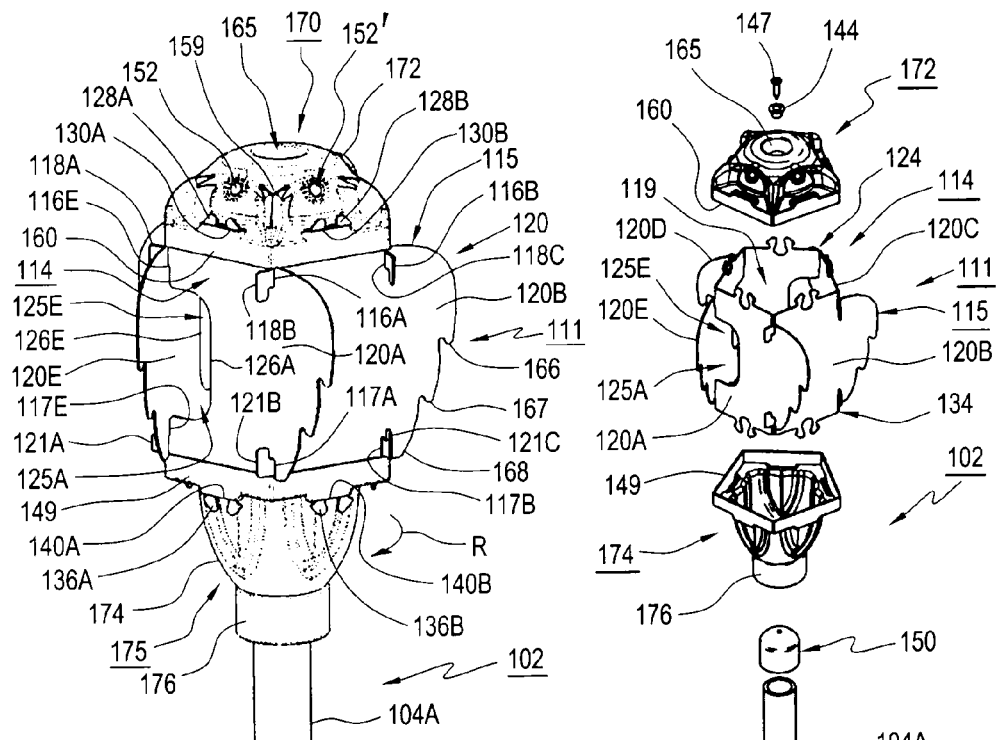
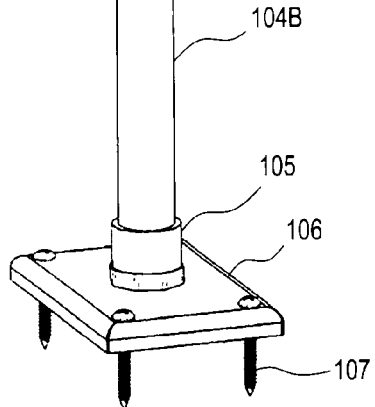
FIG. 17
FIG. 18

BIRD REPELLER AND METHOD OF ASSEMBLY

CROSS-REFERENCE TO RELATED APPLICATIONS

Applicants claim priority to International Application PCT/US07/80188, filed 2 Oct. 2007, which in turn has the benefit of U.S. Provisional Application No. 60/854,335, filed 25 Oct. 2006.

TECHNICAL FIELD

The present invention relates to devices for discouraging the entry of birds into spaces where their presence is undesirable, and more particularly, to a rotating device for scaring birds away from an area in which their presence is undesirable and to methods of making this device.

BACKGROUND OF THE INVENTION

Throughout the United States and other countries, agricultural and aquacultural crop yields are adversely impacted by foraging birds, and protected and endangered birds roost on communications towers and high power electric towers, which limit and preclude access to these structures for installation, maintenance and repairs. In coastal regions of the United States and other countries, protected and endangered birds roost on navigational aids and other marine structures, which limit and preclude access to these structures for installation, maintenance and repairs. Also, marine craft, docks, aids to navigation and other marine structures suffer considerable damage and soilage from the droppings of sea gulls, terns, pelicans, cormorants and other birds. Similarly, communities near garbage dumps and land fills, which often attract large numbers of birds, may sustain similar soilage and damages, such as "white washed" rooftops.

Many devices, such as flags, plastic owls, snakes and other animals, noisemakers, deck sweepers and the like, have been tried in the past to deter birds from alighting on such structures. These prior art devices have had only limited success, at least in part because birds seem to become adapted and acclimated to the presence of the device and then to ignore it.

SUMMARY OF THE INVENTION

The bird repeller of the present invention repels birds through the use of sensory features that may include sounds, vibrations, shapes, light reflections, light distortions, ornamental designs, other visual appearances, and combinations of two or more of these sensory features. These features produce sensory effects that annoy and scare the birds enough to repel them and prevent them from landing and roosting within 10-15 feet of the repeller. Furthermore, the almost constant variations in these effects prevent the birds from getting so accustomed to the repeller that they come to ignore it over a period of time. Prototype testing suggests that one repeller would be effective to keep free of bird droppings an area of 300 square feet or more, and that, over an extended period of time, birds will continue to stay as far away from the repeller as they did on the first day of its installation. It is believed that birds do not get accustomed to the sound, vibration, shape, light reflection, light distortion, ornamental design, visual appearance, and other sound and visual effects, and the combinations of these sensory effects as provided by the repeller, because these effects are constantly changing with the conditions of light and the rotational speed of the rotor member, which varies with changes in the driving wind velocity.

The bird repeller rotor is composed of flat or relatively flat individual parts that may be transported as a relatively flat and compact package and then assembled into a revolving rotor having a hollow barrel and laterally projecting fins adjacent to air vents into a hollow chamber within the rotor barrel. Both the barrel and the projecting fins are assembled from a plurality of fin panels that have an inner barrel segment and an outer fin segment. The outer fin segment (sometimes referred to herein as the "fin") may be either linear or curved outwardly to provide a concave surface on the windward side for more effectively catching wind currents. The barrel fin segment is preferably linear although it also may be curved. The fin panels may be formed from thin (e.g. 0.06 inch thick), UV (ultraviolet light) resistant plastic sheets by stamping or cutting techniques, or by molding from molten plastic materials as is preferred where curved outer fin segments are desired.

Although the number of fin panels employed may be greater or less in number, five (5) or six (6) fin panels are preferred and when these are assembled into a rotor barrel, they respectively form a pentagonal or a hexagonal chamber within a pentagonal or hexagonal barrel wall. Each of the fin panels has at least one body tab and one body slot and the panels are connected together by respectively forcing a body tab of each panel through a body slot of a next adjacent panel so that at least one ear on the tab engages an edge of the slot.

In one preferred embodiment, the head segments and neck segments of the fin panels are also connected together respectively by a head plate and a neck plate, each of these plates having a tab corresponding to each of the fin panels and tab ears adapted to be forced through and engage the edge of a slot in the corresponding panel. In other preferred embodiments, the head segments and neck segments of the fin panels are also connected together respectively by a head cap and a neck cap, each of these caps having a tab or a slot corresponding to each of the fin panels and the fin panels having a slot or tab corresponding to the respective tab or slot of the head or neck cap, each of the tabs having at least one ear adapted to be forced through and engage the edge of its corresponding slot.

After the rotor is assembled, the head plate or head cap is rotatably mounted on the distal end of a support pole having an upper end portion that passes through a pole opening in the neck plate or neck cap. Although the pole opening described below is round, it may have other shapes, such as hexagonal, to create additional rubbing and/or vibratory sounds. The rotor support pole and a mounting base may also be made from individual parts and included in a compact shipping and/or sales package.

The fins may be shaped and angled to catch even the slightest breeze to create a wind turbine effect that spins the rotor on a vertical axis. As air currents of the wind pass across the fins and through the vents, they create a whirring sound that varies with the slightest change in the wind velocity. In addition to the whirring sound, the neck plate or cap opening rubs, wobbles and vibrates against the surface of the vertically mounted pole on which the rotor is rotatably mounted by a mounting arrangement that allows and enhances the wobbling motion of the rotor. Optionally, one or more marbles may be placed on the rotor neck plate or neck cap within the rotor, and bells, clappers or other shakable noisemakers may be attached to an intermediate section of the pole, which also vibrates and shakes in response to the rubbing action of the rotor neck opening against the pole. The resulting noise and vibratory sounds also change constantly with the velocity of the wind.

In addition, flashing movement of the large outwardly projecting fins in the light of daytime or an artificial light source causes a visual disturbance to the birds. This visual disturbance may be enhanced by making the fin segments in the shape of the wings of a bird of prey. In addition, decals with graphic designs comprising bird scaring holographic and/or diffractive images, such as eyes, talons and feathers of a bird of prey, or other frightening designs, may be placed on the support pole, the fins and/or the caps, preferably on the support pole or on the pole and fins, or on the pole, fins and both caps. If used on the fins, these designs are located preferably on the side of the fins in the direction of their rotation.

The present invention thereby provides an optically variable device through the use of holography and/or diffractive imagery preferably to portray a three-dimensional image, such as a predatory bird, and to give the illusion of its movement when viewed from different angles. Thus, the image appears to be constantly moving because its movement is simulated even when the rotor is stationary. The rapidness of this movement increases and decreases respectively with increases and decreases in the rotational speed of the rotor.

In the three preferred embodiments shown in the drawings, the fin panels are preferably made of a clear transparent UV resistant material, and decals with holographic/diffractive feathers of a bird of prey or other scary holographic/diffractive designs are preferably placed on the upper pole section within the barrel of the rotor. When such designs are viewed through a spinning transparent rotor, they are visually distorted to an external observer in continuously varying ways by the passing shapes of both the inner and outer segments of the fin panels, as well as by the intersections thereof and the vents and slots therein, and by tapered tips resembling feathers along the outer edge of the fin panels. It is believed that these distortions are due at least in part to continuously varying refractions of the light reflected from these ornamental designs on the surface of the pole.

Although these distortions alone would be very effective in scaring birds, they are markedly enhanced by including holographic and/or diffractive features in designs on the pole decals, and/or in designs on or molded into the structure of the head and neck caps, because such features provide an appearance of movement upon relative movement between an observer and the pole even in the absence of rotor movement. The transparent fin and cap material may include therein a sprinkling of small reflective particles capable of reflecting light in a flashing manner as the rotor rotates. The combination of the whirring, wobbling and vibratory sounds with the visual effects of the spinning fins and caps has the consequence of making birds sufficiently uneasy that they give a wide berth to the repeller.

Another advantage to the repeller of the invention is the simplicity of its construction and its ease of shipping and assembly. The rotor, which is preferably made of clear UV resistant plastic, is composed of flat or slightly curved fin panels that snap together to form an acoustical chamber with protruding fins. The panels are reinforced at the top by the rotor head plate or cap and reinforced at the bottom by the rotor neck plate or cap. These head and neck components are also preferably made of clear UV resistant plastic. The panels are all held securely in place by slot engaging tabs. Auxiliary fasteners in the form of UV and weather resistant elastic bands, cable (zip) ties, decal strips or other straps may be secured around the head and neck sections of the rotor barrel, such as adjacent to the projecting tips of the head and neck plate tabs of the first embodiment. In the two additional embodiment of the invention, the head plate and neck plate of the first embodiment are replaced by a head cap and a neck cap for securely holding in place the fin panels of the rotor barrel, each cap having an outer flange or sidewall that fits snugly over the end of the head section and neck section, respectively, of the rotor barrel.

The assembled rotor is mounted on the fixed vertical support pole by the head plate or cap, which is secured to the top of a pole cap by a stainless steel screw via a stainless steel or nylon washer or bushing that serves as a rotor bearing. The pole cap is slip fitted or adhesively adhered to the distal head portion of the pole and has a convex outer top surface such that this rotary mounting connection allows the rotor to rotate and wobble freely around the head portion of the pole. A proximate end portion of the support pole is held stationery by securely fastening it to any support structure, such as by plastic cable ties, clamps, plastic or metal bands, bolts, or by slip fitting it into a socket mounted on a support structure, or by simply slipping it loosely into a fishing rod holder on a boat, dock or other support structure.

The number and size of the fins and vents may vary widely, although 3 to 8 fins and vents are preferred, more preferably 4 to 7, and most preferably 5 or 6, for the rotor size described below. Although wing-shaped fins and rectangular-shaped vents are shown in the drawings by way of example, these elements may have other shapes and the fins and vents on the same rotor may have different sizes and shapes. A preferred size of the assembled rotor is between 8 and 12 inches long and between 4 and 8 inches in overall diameter from wing tip to wing tip, so that the assembled device is compact and can be easily stored in a small space, such as a storage cabinet on a boat, when it is not deployed in its active position on the mounting pole.

As one specific example, the assembled rotor may be 9.25 inches long and 6 inches in overall diameter from wing tip to wing tip. The overall diameter of the rotor barrel between opposite intersections of the fin panels may be 2.18 inches and the overall diameter of the head and neck plates or caps may be 2.25 inches. However, as a further alternative, the diameters of the head and neck plates or caps may be substantially different, such as a head plate or cap of substantially greater diameter than the corresponding neck plate or cap so that the sidewalls of the barrel are tapered inwardly from top to bottom.

Where the overall length (height) of the rotor is about 9.25 inches, the fin segment 15 may be about 6.5 inches long (high) along the spin axis from shoulder 62 to wing tip 64 and about 2.5 inches wide (i.e., the wing span of the fins beyond the barrel). The optimum number of fins and barrel vents is 5 or 6. The vents 20A-F are preferably about 5 to 8 inches long, such as about 7.75 inches long, and preferably about 0.3 to about 0.5 inches wide, such as about 0.4 to about 0.45 inches wide. Longer and wider vent openings will provide a fin structure that is lighter than provided by smaller vent openings, so the former are preferred where their use does not compromise the strength and durability of the fin panel structure.

The neck opening in the rotor neck plate or cap, which allows the rotor to be slipped over the pole cap and distal portion of the mounting pole, may be between about 1.25 and about 1.5 inches in diameter, and the adjacent diameter of the mounting pole may be about 0.75 to about 1.0 inch, respectively. A clearance of about 0.125 to about 0.25 inch between the surface of the neck opening and opposing side surfaces of the mounting pole is preferred to provide a substantial wobbling action of the rotor relative to the central axis of the pole and effective frequencies of bird repelling noises and vibrations.

Although the preferred material of the rotor is transparent UV resistant plastic, other transparent materials such as glass may be used. Also opaque materials and other non-transparent materials, such as steel, aluminum and other metals, may be used, but in these cases the width of the vents should be maximized to permit at least some view of the post decals, and holographic/diffractive decals should also be used on the fins/wings. Instead of stainless steel, the bearing washer or bushing may be made of Teflon, nylon or some other "frictionless" polymer. The mounting pole may be made of hollow or solid plastic, wood or metal. The plastic may be PVC, the wood may be pine or oak, and the metal may be steel or aluminum.

The second and third embodiments illustrate that the wall thickness in the area of the head cap or head plate aperture may be increased so that a convex surface can be provided on the underside of this area for resting against the corresponding concave outer surface on the upper end of the pole cap. This arrangement may provide greater rotor wobble than the rotary screw connection shown with the first embodiment, and thereby may produce a more effective vibratory sound by the rubbing action between the pole opening of the rotor and the support pole. In addition, horizontal or vertical ribs may be provided on the surface of the neck opening for the pole in the neck plate and/or neck cap to also enhance the vibratory sound produced by the rubbing action between this surface and the outer surface of the support pole.

The above features and benefits and the proven effectiveness of a prototype, combined with the simplicity and low cost of making the components of the rotor and packaging and shipping these components in a relatively flat and inexpensive container, and with the simplicity and ease of assembling the rotor components, make the bird repeller of the present invention a significant improvement over those described in my prior U.S. Pat. No. 6,557,482 and No. 6,814,021, the entire contents of which are expressly incorporated herein by reference.

BRIEF DESCRIPTION OF THE DRAWINGS

The components, method of assembly, assembled structure, and operation of the invention may be further understood by reference to the detailed description below, taken in conjunction with the accompanying drawings in which:

FIG. 17 is an elevational perspective view of a third embodiment of the invention;

FIG. 18 is an exploded elevational perspective view of the embodiment of FIG. 17 illustrating the assembly of its components;

DETAILED DESCRIPTION OF PREFERRED EMBODIMENTS

Figure 1:
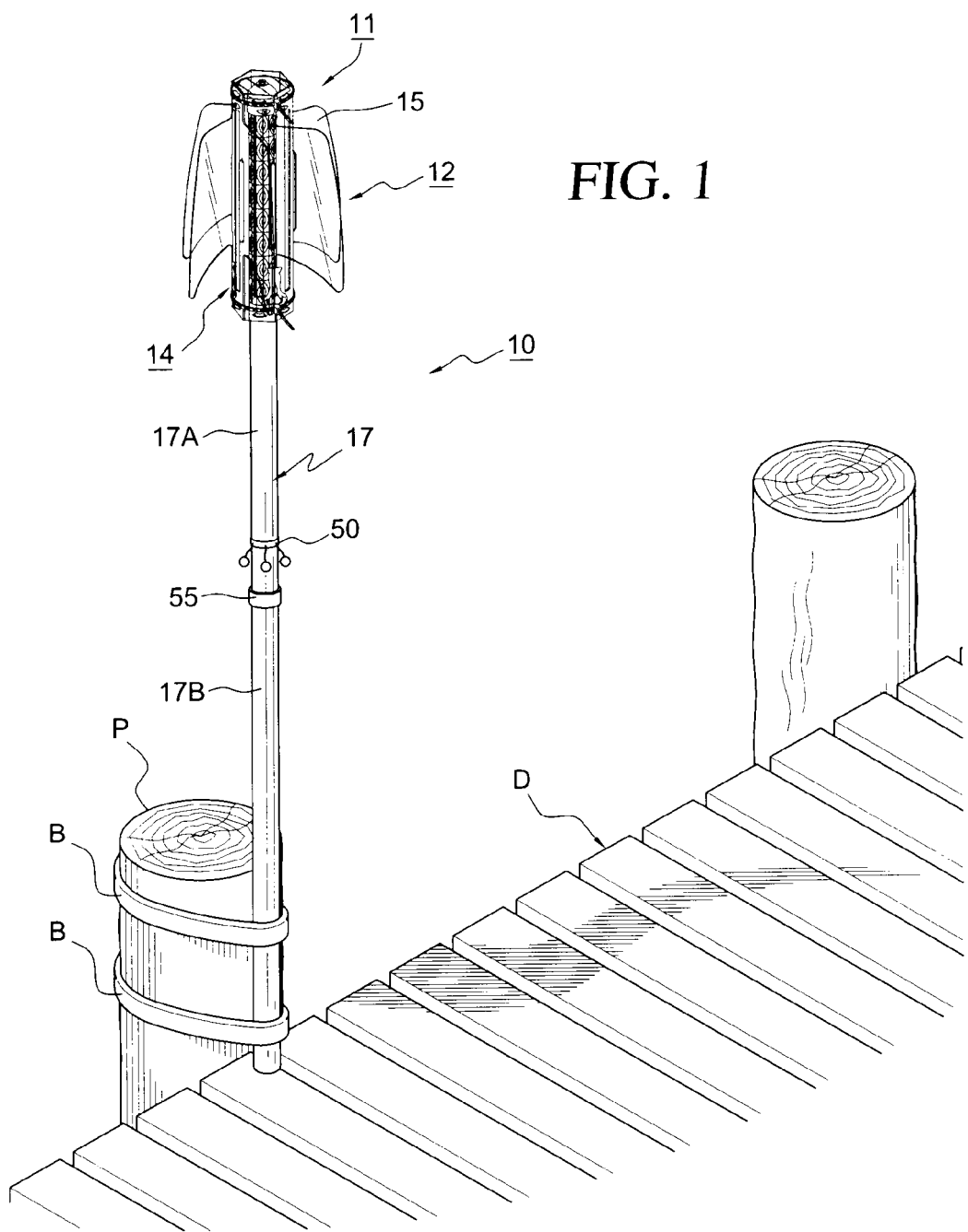
FIG. 1 is a prospective view illustrating an installation of the invention on a dock to repel sea birds.

Referring to FIGS. 1 to 6, there is shown a bird repeller assembly, generally designated 10, comprising a plurality of fin panels, generally designated 12, which when assembled form a rotor 11 having a hollow inner barrel 14 and a plurality of outwardly projecting fins 15. Although the number of fin panels may be less (a minimum of 3) or more (e.g. 7 to 10), the preferred embodiment comprises a rotor 11 made up of six (6) linear fin panels individually designated as 12A, 12B, 12C, 12D, 12E and 12F in FIG. 3, or a modified rotor 1P made up of six (6) curved fin panels individually designated as 112A, 112B, 112C, 112D, 112E and 112F in FIG. 7. The rotors 11 and 11' are assembled from the individual fin panels as described below and then rotationally mounted on an elongated supporting member, such as pole or standard 17, having its proximate end secured by a pair of metal or plastic bands BB or other fastening means to the piling P of a dock D or some other structure that may be land based or floating on a body of water. Pole 17 optionally may be assembled from smaller segments, such as 17A and 17B, that are detachable connected by a coupling 55 and therefore can be disassembled for shipment. As may be seen best in FIGS. 4 and 5, the rotor barrel 14 comprises a head section 24, a neck section 34, and a central acoustic section 19 having a plurality of vent openings 25A-F each located in the inner barrel portion 13 (FIG. 3) of a corresponding fin panel 12.

Figure 2:
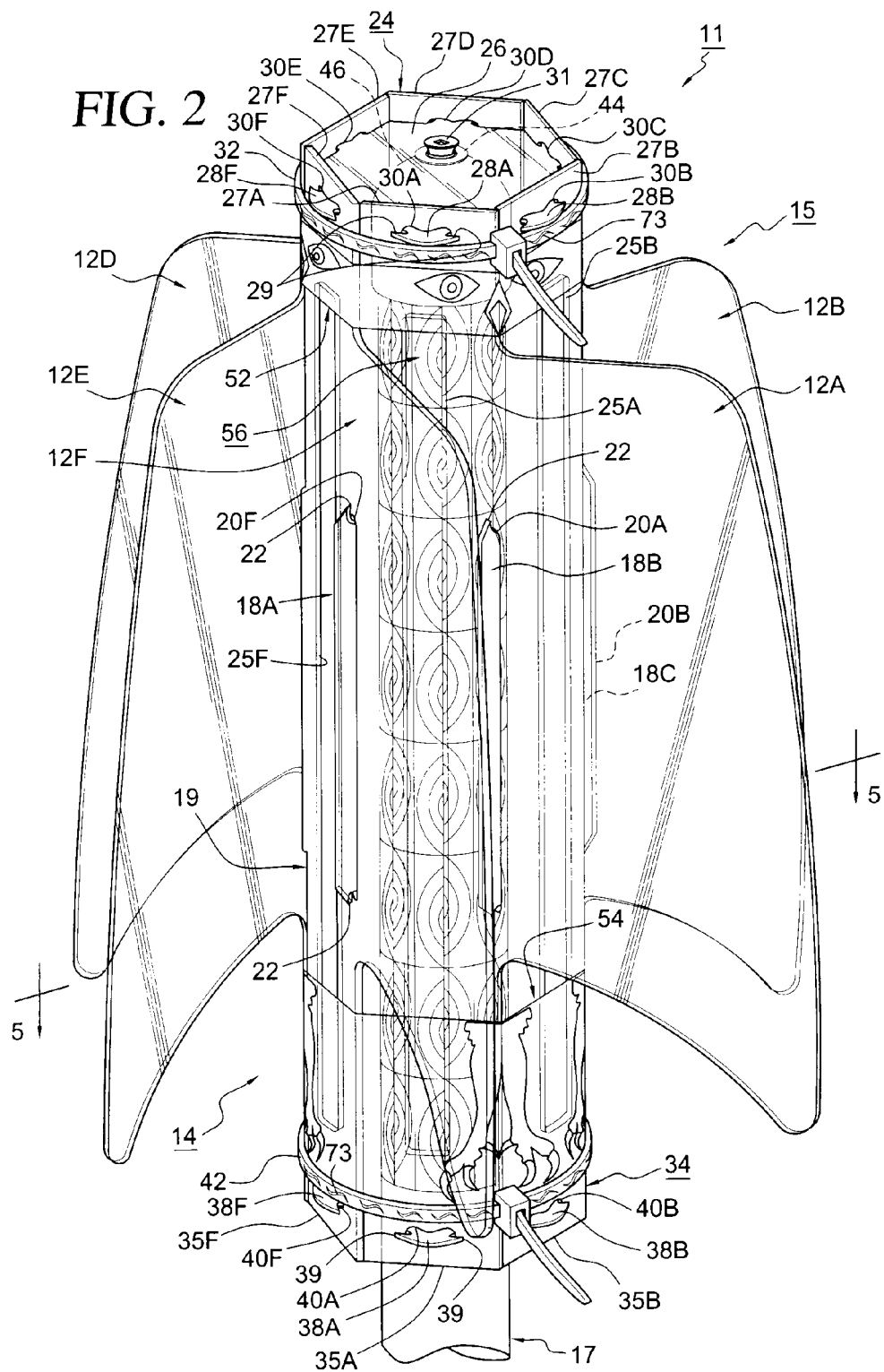
FIG. 2 is an elevational perspective view of the invention of FIG. 1.
Figure 3:
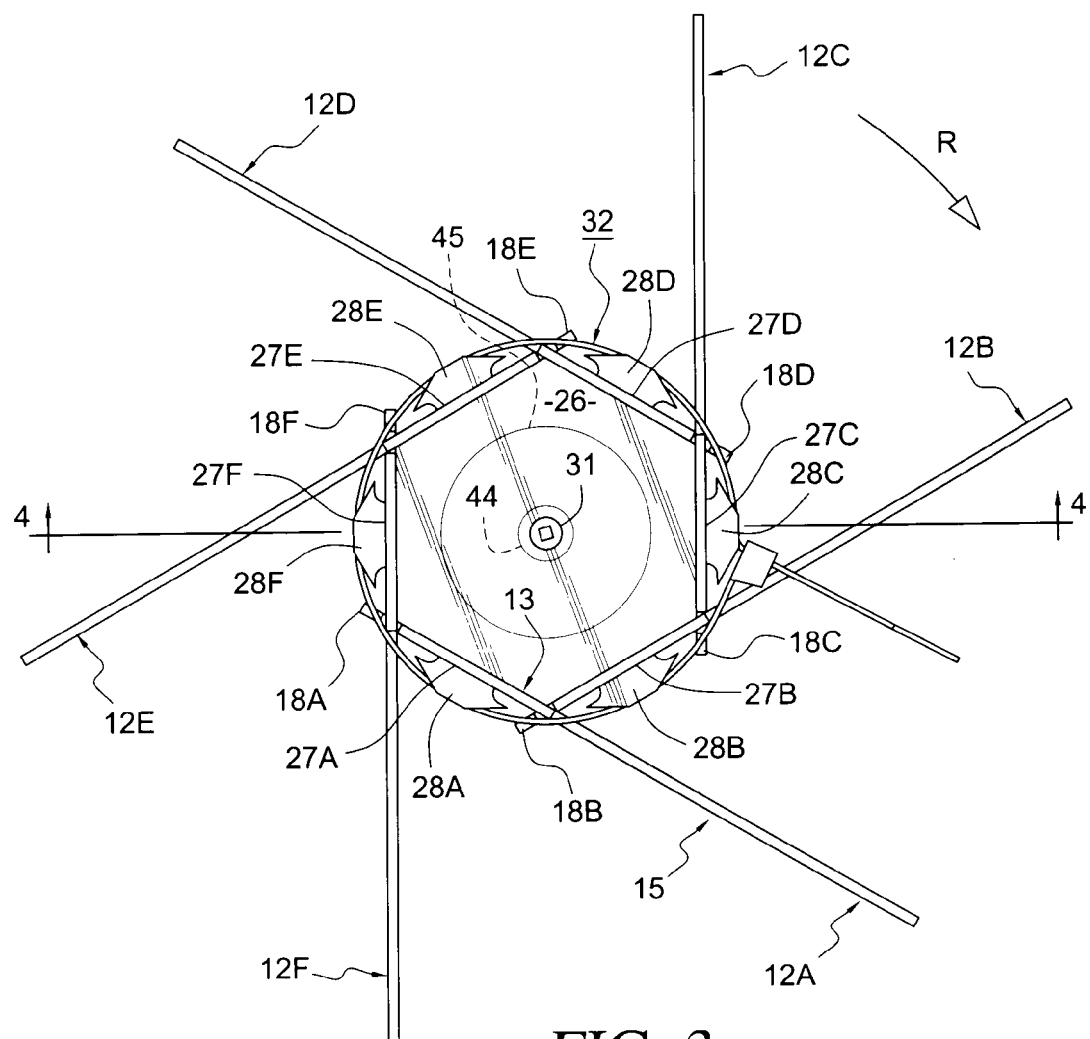
FIG. 3 is a top plan view of the invention of FIG. 1.
Figure 4:
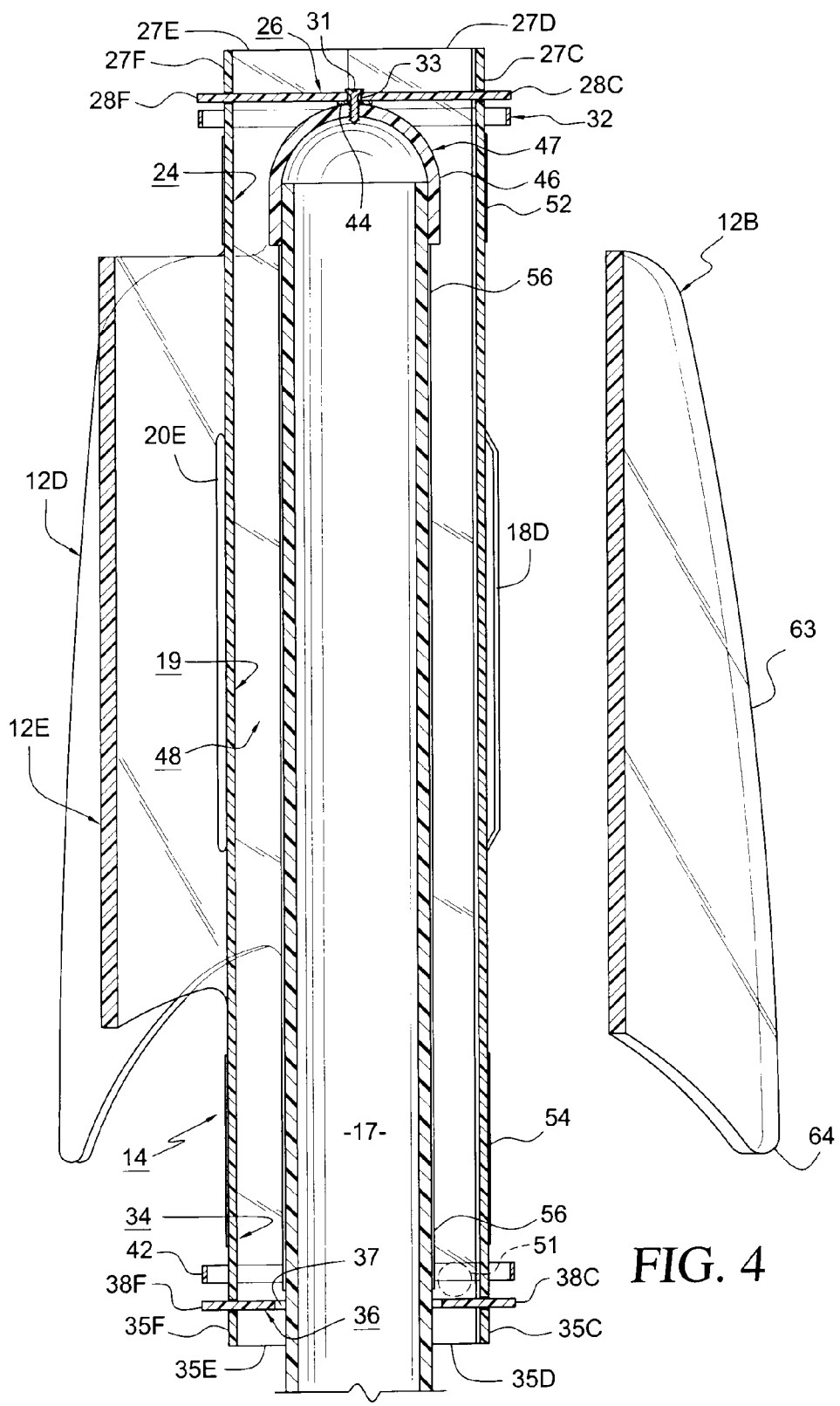
FIG. 4 is an elevational cross-sectional view of the invention taken along line 4-4 of FIG. 3.
Figure 5:
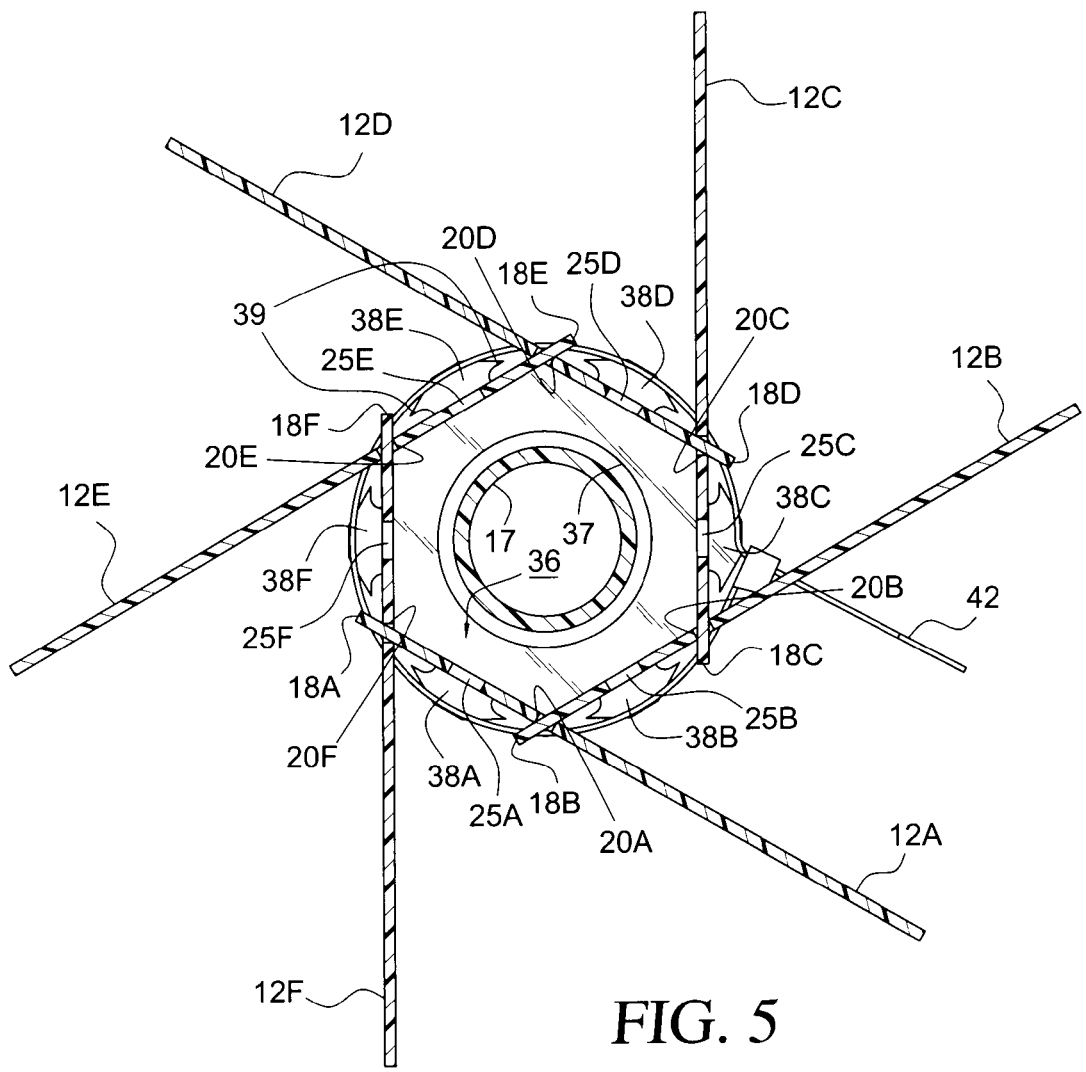
FIG. 5 is a plan cross-sectional view taken along line 5-5 of FIG. 2.
Figure 7:
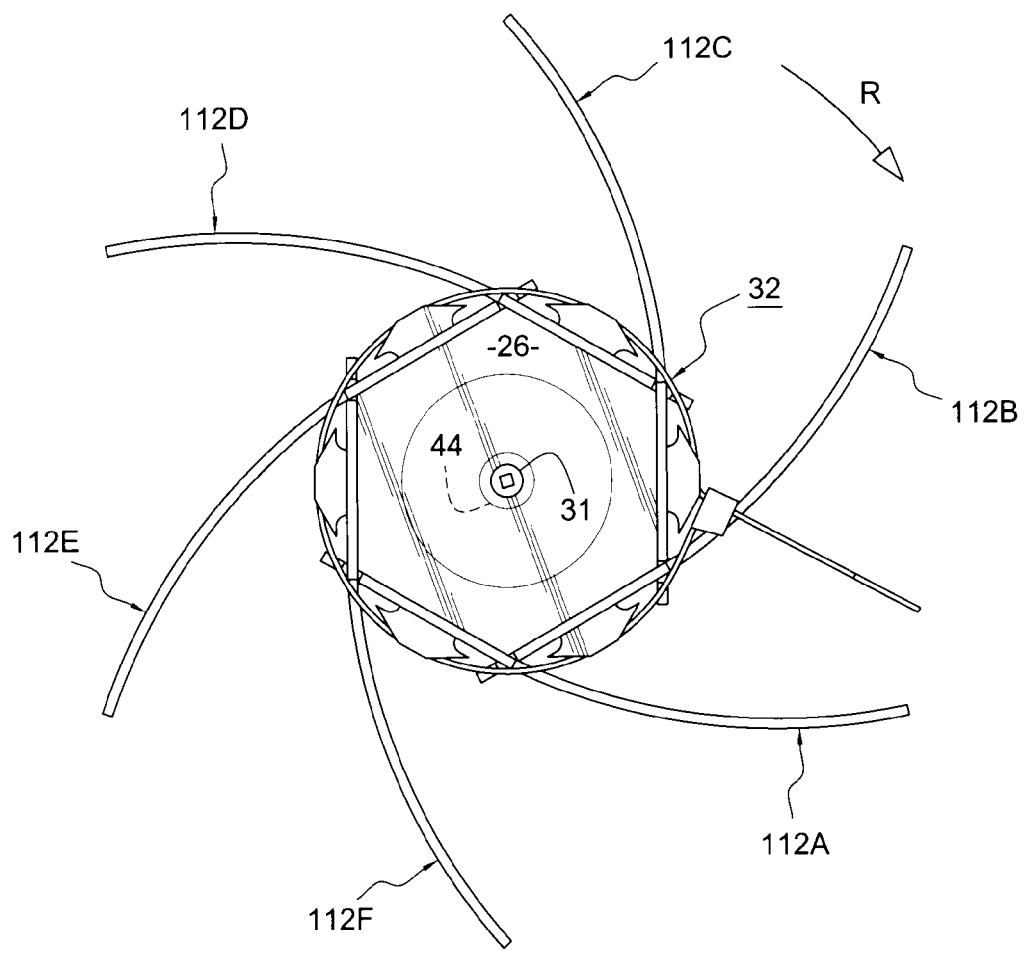
FIG. 7 is a plan cross-sectional view similar to FIG. 5 showing a modification of the fin components according to the invention.

As may be seen in FIG. 3, the fin panels 12A-F intersect with each other at an acute angle that forms a pocket for catching a wind current produced by the prevailing wind. The wind current provides an air flow over the outwardly projecting fins 15 of the fin panels, which causes the rotor to rotate in the direction of arrow R in FIGS. 3 and 7 due to the cupping action provided by the pockets as they face upwind. The outwardly projecting fin portions 15 of the panels may be either linear as shown by the stamped panels 12A-F in FIG. 3, or curved away from the direction of rotation as shown by the molded panels 112A-F in FIG. 7, such that the convex side of the fin is in the rotational direction R. Rotation of the rotor may be enhanced by the additional cupping action provided by the concave sides of the curved fins. The fin panels of FIG. 2 are preferably stamped from sheets of clear transparent plastic material, while the fin panels of FIG. 7 are preferably molded from clear transparent plastic material, both of these materials are preferably UV resistant.

The individual fin panels 12A-12F are fitted and held together by corresponding centrally located fin tabs 18A-F that pass through corresponding centrally located slots 20A-F, the fin tab on each fin panel passing through the slot on an adjacent fin panel. The length of the fin tabs is greater than the length of the fin slots to the extent that ears 22, 22 at each end of these tabs must be forced through the slots to engage the slot rim on the opposite panel surface and thereby lock the fin panels together. This assembly of the fin panels forms the barrel 14, the central section 19 of which supports the outwardly projecting fins 15. The barrel 14 also has a head section 24 formed by head segments 27A-F of the corresponding fin panels, and a neck section 34 formed by neck segments 35A-F of the corresponding fin panels.

The head segments 27A-F of the fin panels are secured together by tabs 28A-F of a head plate 26 to form the head section 24. For this purpose, the head segments 27A-F have corresponding slots 30A-F for receiving and being engaged by the corresponding tabs 28A-F on the head plate 26, which thus has six tabs each corresponding to one of the fin panels. Each of the tabs 28A-F has a pair of ears 29,29 at respective side edges for engaging adjacent edges of the rim of slots 30A-F upon being forced therethrough.

The head sections of the fin panels are further secured together by an elastic band or other head strap, such as a cable tie 32, which serves as an auxiliary fastener for firmly securing together the head sections. Cable tie 32 is preferably positioned below the outer projecting ends of the multiple tabs 28A-F of the head plate as shown in the drawings. As also shown, the head plate has an aperture 33 for receiving a threaded screw 31 for securing rotor 11 to the top of the pole 17 as described below.

The fin panels 12A-F are also secured together by neck segments 35A-F that forming the neck section 34. For this purpose, the neck segments 35A-F have corresponding slots 40A-F for receiving corresponding tabs 38A-F of a neck plate 36 having an opening 37 for receiving a distal end portion of the pole 17. Each of the tabs 38A-F have a pair of ears 39,39 along opposite edges thereof so as to engage adjacent edges of the rim of the slot after the plate tab is forced through the slot by compressing the ears, which are resilient. An elastic band or other neck strap, such as a neck cable tie 42, is preferably provided as an auxiliary fastener for securing together the neck segments 35A-F to form the neck section 34.

Returning now to FIGS. 1 and 4, the head section 27 of barrel 14 is rotatably secured to the top or distal end of pole 17 by screw 31 passing through the aperture 33 in head plate 26 and through the hole of bearing washer 44, and then being threaded into a plastic pole cap 46 that may be snuggly fitted onto the distal end of the pole 17. Its snug fit and elasticity will keep pole cap 46 securely in place on the pole, while allowing removal of the cap for storage or pole replacement. Alternatively, pole cap 46 may be permanently adhered, as by an adhesive, to the distal end of the pole 17. The pole cap 46 preferably has an upstanding top wall with a convex upper surface 47 on which rests the flat underside of washer 44 to facilitate wobbling of repeller 11 as it spins to create a bird frightening noise by causing the wall of neck plate opening 37 to rub and beat against the surface of pole 17.

Figure 10:
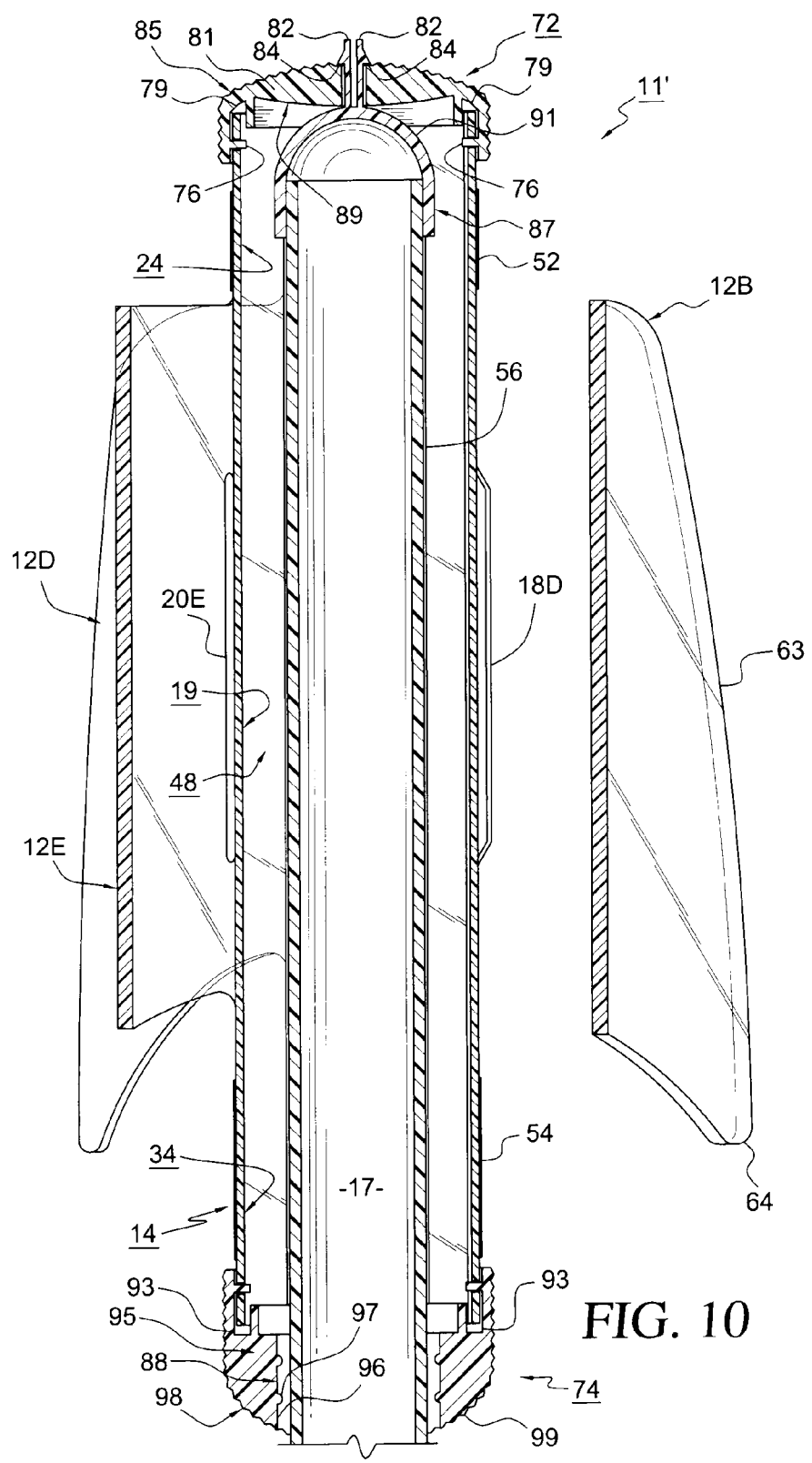
FIG. 10 is an elevational cross-sectional view of the invention taken along line 10-10 of FIG. 9.
Figure 11:
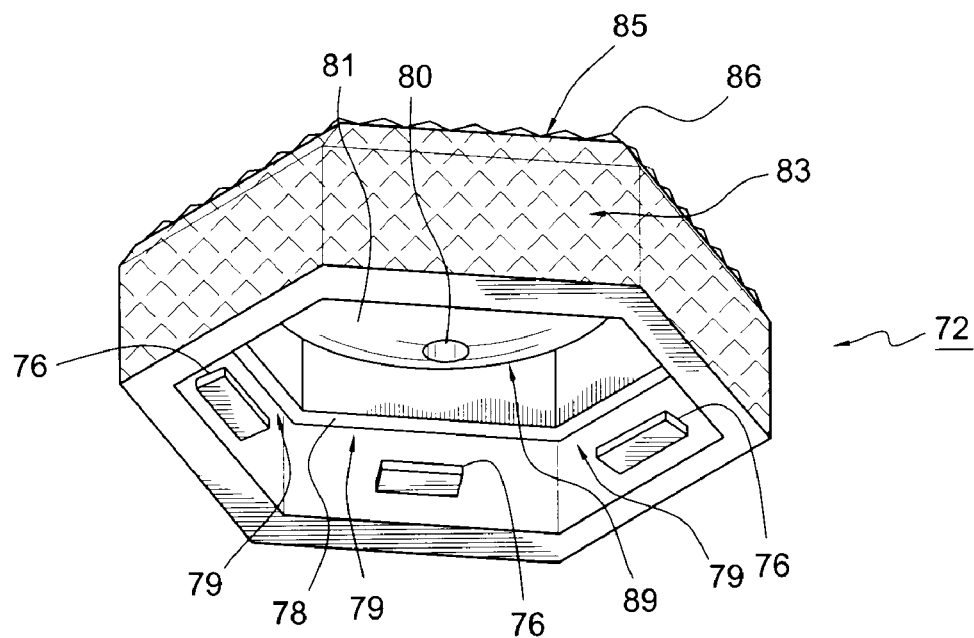
FIG. 11 is a bottom perspective view of the head cap component of the embodiment of FIG. 9.
Figure 12:
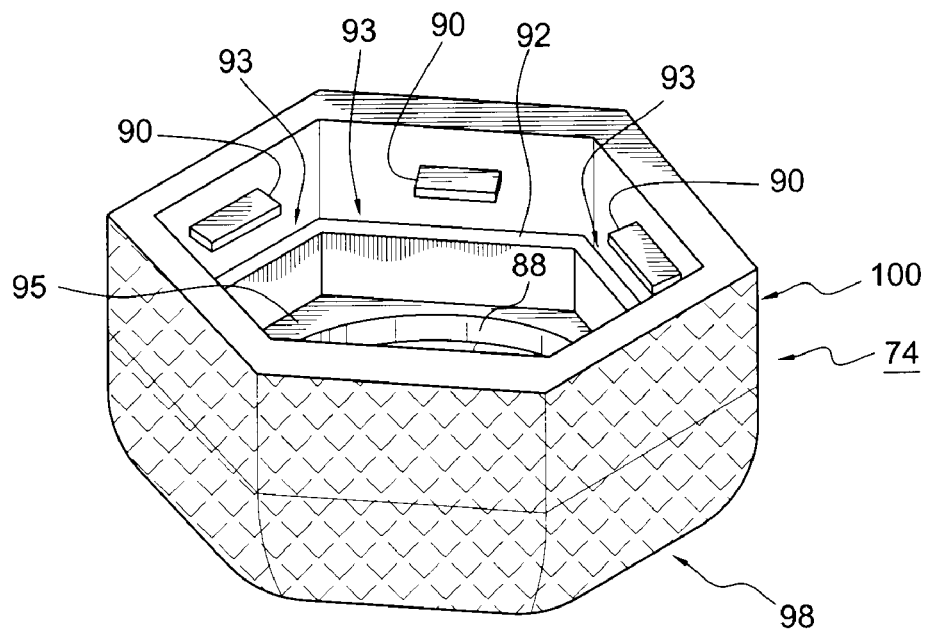
FIG. 12 is a top perspective view of the neck cap component of the embodiment of FIG. 9.
Figure 13:
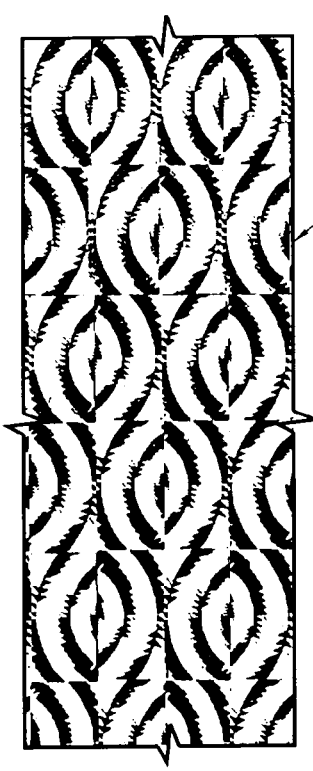
FIGS. 13, 14, 15 and 16 are fragmentary elevational views of decals having holographic/diffractive designs on their outer surfaces for application to an upper portion of the rotor support pole.
Figure 14:
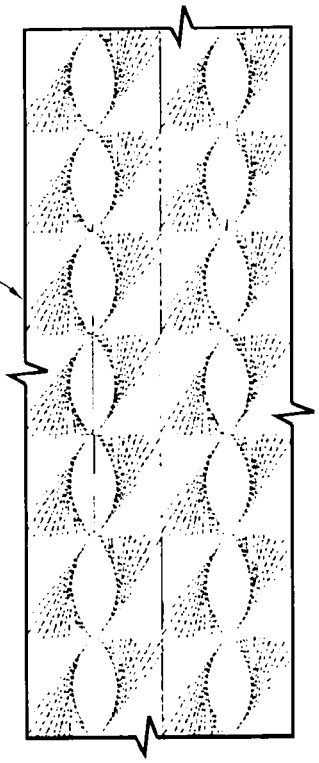
Figure 15:
Figure 16:
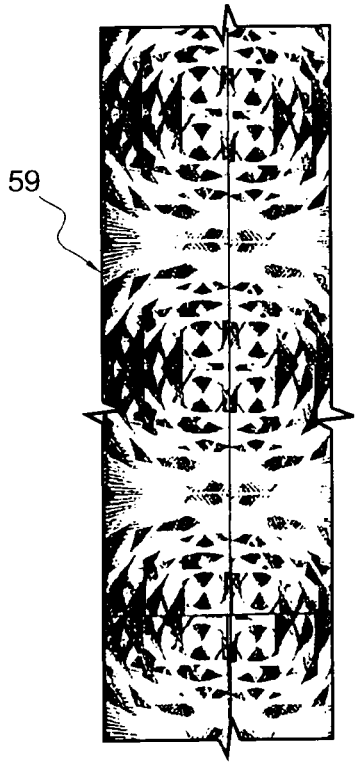

The hexagonal chamber 48 enclosed within the acoustic barrel section 19 serves as an acoustic chamber by amplifying both the sound generated by wind passing through the vents 25A-F and the sound generated by the contact between the pole and the surrounding wall of the pole opening 37 in the neck plate 36 as the repeller rotor 11 spins around the pole with a wobbling action. This wobbling action causes the neck plate to rub and beat against the pole and thereby generate a vibratory noise and clacking reverberations that are amplified by the acoustic chamber. This rubbing and beating action may be enhanced by providing convolutions, ribs, ridges or other bosses, such as the circumferential ribs 97 in FIG. 10, that also may be provided on the inner surface of the neck plate opening 37, which would be increased in area by making plate 36 thicker around opening 37. Elongated bosses may be oriented vertically, horizontally or diagonally.

As an optional feature, one or more shakable noise makers, such as a plurality of bells 50, may be attached to the pole 17, which also vibrates and thereby shakes the noise makers to produce additional bird repelling noise in response to the rubbing and beating action of the rotor neck against the pole. The noise makers may instead be attached to the head plate 26 and/or the neck plate 36, to the head and/or neck cap described below, or to some other component of the rotor. In addition, one or more ball bearings or marbles 51 (FIG. 4) may be placed inside the rotor barrel 14 to roll along the inner surface of neck plate 36 and thereby create further bird repelling noise.

The wind currents, which produce rotation of the rotor by impacting against the projecting fins 15, also pass over these fins and through the vents 25 to generate a whirring noise. In other words, wind currents pass through the upwind vent openings oriented toward the wind direction and into the acoustic chamber 48 of acoustic section 19 and then pass out of this acoustic chamber through the downwind vent openings oriented away from the wind direction. This wind current airflow, in combination with rotation of the rotor 11 is believed to be the source of the whirring noise observed during prototype testing. In addition, the rubbing and beating action of the neck plate against the pole generates a wobbling and clacking noise having a constantly changing rhythm or reverberation cycle.

Referring to FIG. 7, rotation of the rotor 11 may be enhanced by forming the outer fin segments 15 with a curvature providing a concave surface that will be oriented toward the wind direction as the rotor 11 rotates in response to the wind currents. This curvature of fins 112A-F produces an aerodynamic shape that makes more efficient use of the wind by increasing the cupping action of the fin pockets as they face upwind.

Figure 6:
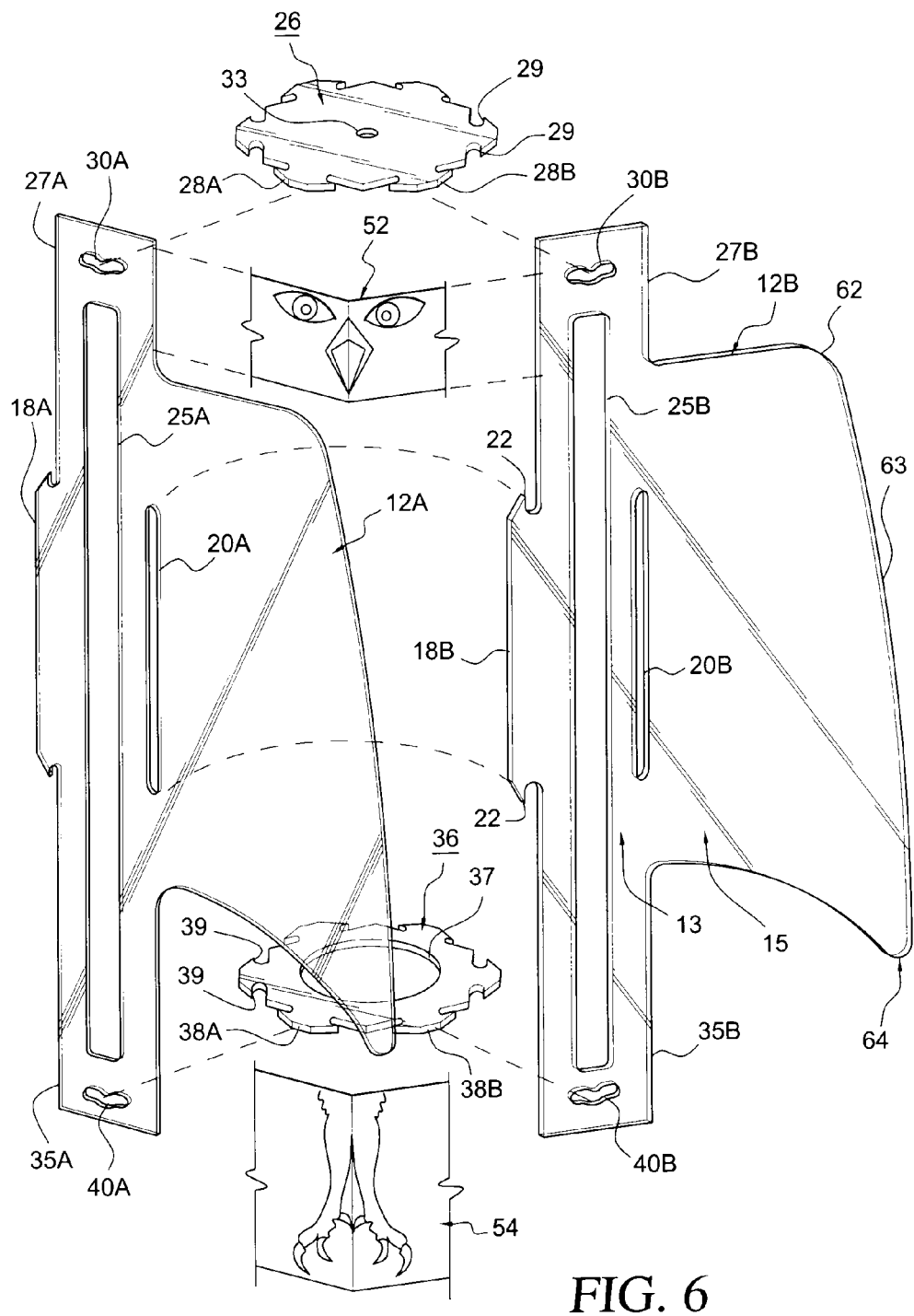
FIG. 6 is an exploded view of several components of the invention illustrating their assembly.

Referring now to the exploded view of FIG. 6, the method of assembling the rotor 11 from the (6) identical fin panels 12A-F and the two end plates, i.e., head plate 26 and neck plate 36, will now be described. First, the head plate tab 28A is forced through the head slot 30A of fin panel 12A until the ears 29, 29 pass completely through this head slot and snap outward against the forward surface of panel 12A relative to the rotation direction. Next, the neck plate tab 38A is forced through the neck slot 40A until the ears 39, 39 pass completely through this neck slot and snap outward against the forwarded surface of panel 12A. Then, the fin tab 18B of fin panel 12B is forced through slot 20A of fin panel 12A until its tabs 22, 22 snap outward against forward surface of panel 12A. Next, the head plate tab 28B is forced through the head slot 30B of panel 12B and the neck plate tab 38B is forced through the neck slot 40B of panel 12B, until their respective ears 29, 29 and 39, 39 snap outward against the forward surface of fin panel 12B.

During the insertion of tab 28B into slot 30B and tab 38B into slot 40B, the much longer central tab 18B of fin panel 12B is forced through central slot 20A of panel 12 A until the tab ears 22, 22 snap outward against the forward surface of fin panel 12A. The foregoing steps are repeated for the remaining fin panels 12C, 12D, 12E and 12F until the rotor barrel 14 is in the assembled condition shown in FIGS. 1-3. Assembly of the rotor 11 is then completed by placing and securing cable tie 32 firmly around head section 24 just below the radially projecting heads of the head plate tabs 28A-F, and by placing and securing cable tie 42 firmly around neck section 34 just above the radially projecting heads of neck plate tabs 38A-F as may be seen best in FIGS. 2-4.

Although not required for its mechanical operation, the effectiveness of the rotor in scaring birds may be enhanced by the addition of decals utilizing holographic and/or diffractive imagery to the external surfaces of the head section 24 or the neck section 34 or both of these sections. The substrate of these decals are preferably adorned with holographic/diffractive designs of the type previously described and has an adhesive backing to adhere it to the barrel of the rotor. Although the substrate may conform generally to the size and shape of the design it carries, the substrate is preferably elongated so as to carry a plurality of designs. This elongated substrate is preferably strong enough and long enough to be wrapped entirely around the head and neck sections and thereby serve as straps for respectively securing together the head segments and neck segments, either as substitutes for head cable tie strap 32 and neck cable tie strap 42 or as supplemental securing straps.

By way of a preferred example, the head section decal 52 may comprise an artistic rendering of three sets of eyes and beaks of a hawk with each set positioned so that the beak is placed over the intersection between two of the fin panels, which causes the eyes on either side of the beak to be placed on the flat surface of the two adjacent panel head segments as illustrated in FIG. 2. Similarly, the neck section decal 54 may comprise an artistic rendering of three sets of the legs and claws of a hawk. Decal 54 is preferably placed with the junction of the hawk legs on the intersection between two adjacent neck panel segments so that the claws are placed respectively on the flat surfaces of these adjacent segments, as also shown best in FIG. 2. In addition, the outer surfaces of both head tie 32 and neck tie 42 may be adorned with a holographic/diffractive design 73 of the type previously described.

A particularly important feature of the present invention is the placement and use of a decal on the upper segment of the pole 17 so that it will be located within the acoustic central section 19 of the barrel 14 when rotor 11 is in its pole mounted position with head plate 26 secured to the pole cap 46. By way of example, artistic renderings of four different holographic/diffractive designs for the outer surface of the pole decal are illustrated on the pole decals 56, 57, 58 and 59 shown respectively in FIGS. 13, 14, 15 and 16. These decals have an adhesive backing to adhere them to the upper pole segment. A particularly effective design is that of decal 56 which simulates the feathers of a hawk or other predatory bird.

Because of their holographic/diffractive nature, the contents of these decals appear to move upon any movement between the decal and observing bird or other animal, even in the absence of a rotor rotation when viewed from different angles. Upon rotation of the rotor 11 relative to the decal on pole, the apparent movement of decal contents is greatly enhanced by the reflections, refractions and other distortions created as the rotor fins, barrel openings, fin to fin junctions and other structural features of the transparent rotor move past the decal design. In other words, by reflection and/or refraction, the holographic/diffractive imagery is transmitted through and also superimposed onto the wing-like fins to further enhance the illusion of a three dimensional image and movement of a bird of prey. The pole decals preferably have width so that they extend entirely around the circumference of the pole, and preferable a length so that they extend along the pole parallel to its axis for a length corresponding to about the axial length of the outer fin portions 15 from the beginning of the shoulder segment 62 to the end of the tapered tip segment 64.

By way of example, the length of decal 56 as shown in the position of FIG. 2 would be about 7.75 inches and would preferably extend about three-fourths of an inch below head plate 26 to about three-fourths of an inch above neck plate 36, where the overall length of the fin panels 12 is about 9.25 inches and the axial length of fin 15 from the beginning of shoulder 62 to the end of tip 64 is about 6.5 inches. In this example, the length of vent 25 is preferably at least as long as the fin length (height), e.g., preferably in the range of about 6.5 to about 8.0 inches, and more preferably about the same length as the decal 56, e.g., 7.75 inches.

As previously mentioned, another particularly important feature of the invention is that all of the designs on the decals 52, 54, 56-59 preferably utilize holography and/or diffractive imagery to generate the appearance of movement of a three dimensional object. This apparent movement is generated by relative movement between the object and the eye of an observer, such as a person or bird. On the other hand, the fin panels 12 are preferably made of clear plastic so that spinning of the fins 15 past the holographic/diffractive images on the upper pole segment causes light reflection, refraction and distortion at continuously varying angles such that the holographic/diffractive images on the pole appear to move without any relative movement between the images and the eye of the observer. Furthermore, since the decals 52 and 54 on outer surfaces of the rotor also have this holographic/diffractive effect and are constantly moving with rotor rotation, this rotational movement relative to the eye of an observer, combined with the holographic/diffractive nature of the image, causes the apparent movement of the image to be much faster than would otherwise be generated by rotation of non-holographic/diffractive images. In addition, both rotation of the holographic/diffractive images on the rotor barrel 14 and rotation of the transparent fin panels 12 past the holographic/diffractive images on the rotor pole 17 produce very rapid flashing effects that are especially frightening to birds and other animals.

Figure 8:
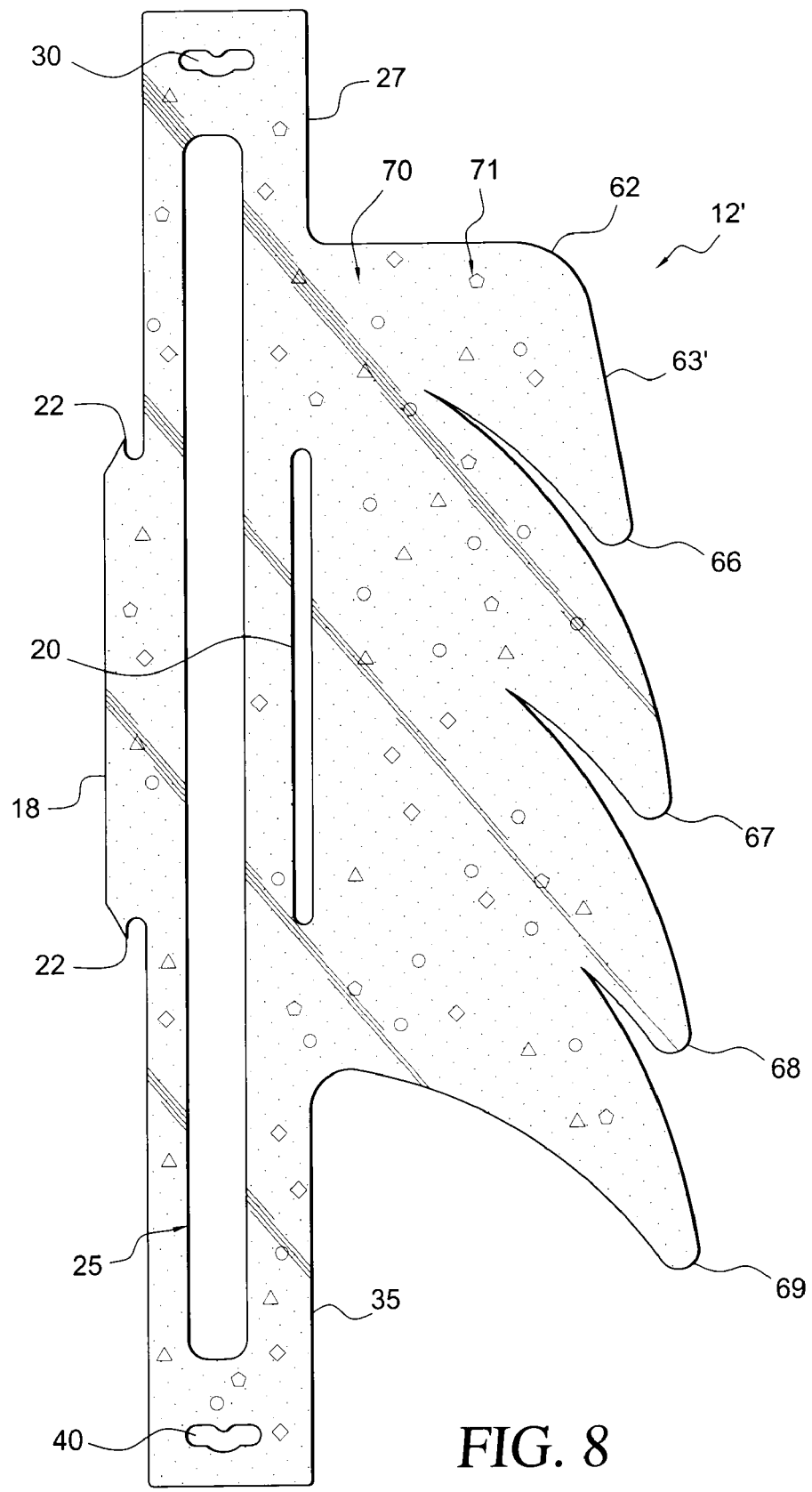
FIG. 8 is an elevational view showing a further modification of the fin components according to the invention.
Figure 9:
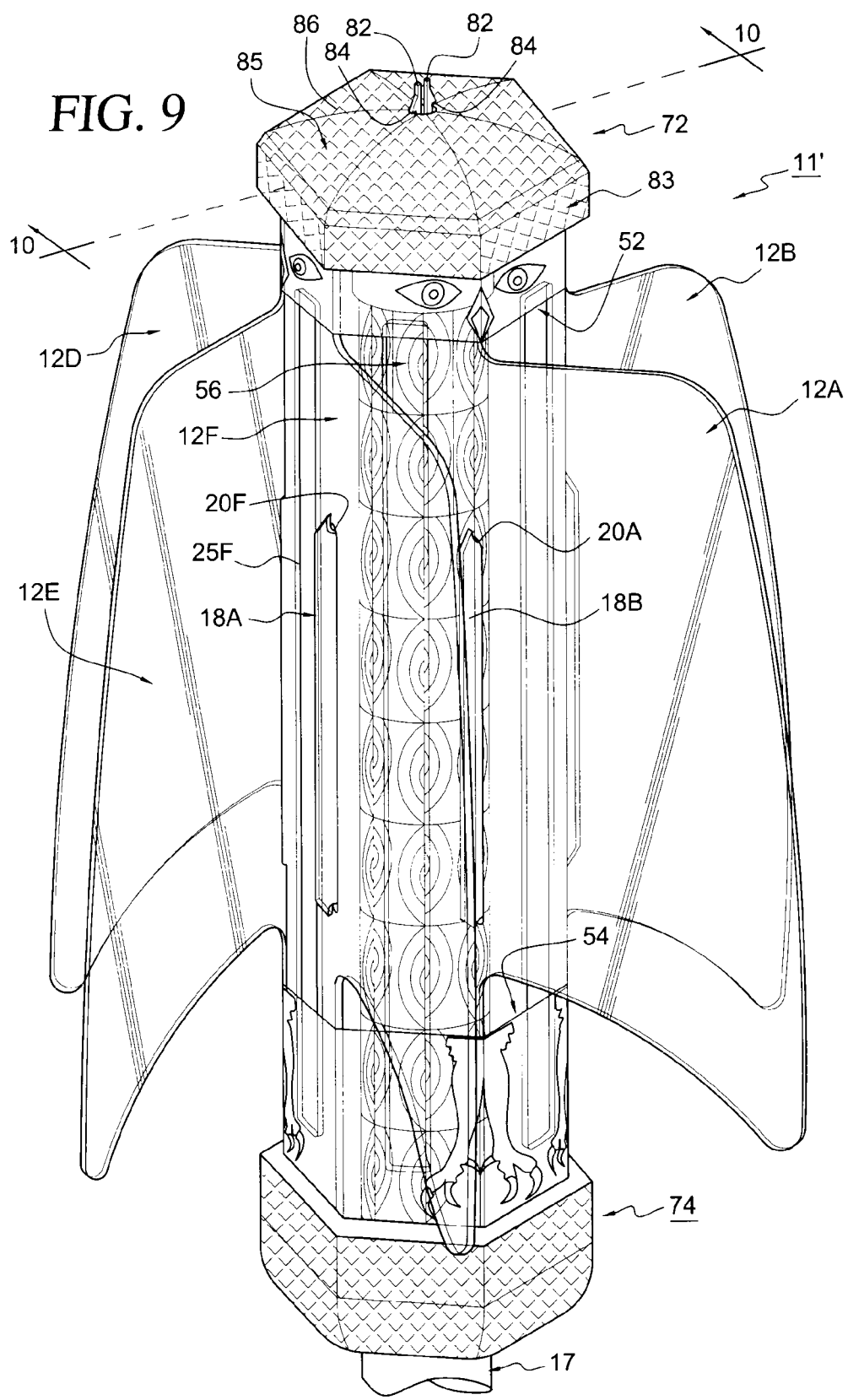
FIG. 9 is an elevational perspective view of a second embodiment of the invention.

For further enhancing the rapid flashing effect caused by rotor rotation, light reflective particles, such as faceted particles 70 and sparkles 71, may be embedded within the transparent material of the fin panels, as illustrated by fin panel 12' in FIG. 8. The cable ties 32 and 42, or similar types of fastening straps, may also be provided on their outer surface with a holographic/diffractive design 73 to enhance the visual effects created by rotation of the rotor 11.

As a specific example, the dimensions of one preferred embodiment of the invention is described here. In this description, the lengths of the fin panel and its features become the height of the panel and those features when the rotor 11 is mounted on the pole 17. Thus, in a side view of fin panel 12 or fin panel 12' (FIG. 8), the panel would have the following dimensions: overall length of 9.25 inches, overall width of 3.72 inches, head segment length of 1.47 inches, neck segment length of 2.33 inches (to the base of fin 15), head segment and neck segment width of 0.79 inches, fin length of 6.46 inches as measured parallel to fin panel length, and distance from fin tip 64 to distal end of neck segment 35 of 1.32 inches as measured parallel to fin panel length. Slots 30 and 40 are preferably about one-quarter of an inch from the respective ends of head segment 27 and neck segment 35, vent 25 is preferably about 7.75 inches in length, and fin panel slot 20 is preferably about 2.95 inches in length.

Ears 22, 22 of tabs 18A-F, ears 29, 29 of tabs 28A-F, and ears 39, 39 of tabs 38A-F preferably extend at least 0.06 inches beyond the edges of the rims of their corresponding slots when snapped fully therein. The thickness of the fin panels 12 are preferably at least 0.06 inches. When these example fin panels are assembled, they produce a rotor 11 having an overall height of 9.25 inches and an overall diameter of 6.00 inches with a barrel diameter as measured along the inside surface of installed cable ties 32 and 42 of 2.18 inches. The overall dimension of the head plate 26 and the neck plate 36 from tab tip to tab tip is 2.25 inches and the plate also have a thickness of at least 0.06 inches. The screw aperture 33 in head plate 26 is 0.19 inches, and the pole opening 37 in neck plate 36 is 1.25 inches for a pole diameter of 0.75 inches to provide a gap of 0.25 inches between the side surface of the pole and the surface of the opening when the axis of the pole is centered in the opening.

Another important feature of the rotor 11 is that the fin portion 15 of the fin panels 12 is shaped like the wing of a bird of prey, such as a hawk corresponding to the hawk decals 52 and 54. To further enhance this bird of prey effect, the holographic/diffractive design on the pole decal 56 may resemble the coloring and shape of the feathers of a hawk. It has also been found that the tapered wing tip segments 64 provide a more pronounced flashing effect by reflecting light onto surrounding and adjacent surfaces because of their sharp taper as compared to the fin shoulder segment 62 and the outer edge segment 63. To further enhance this effect, there is shown on the modified fin panel 12' in FIG. 8 an outer edge segment 63' having four tapered wing tip segments 66, 67, 68 and 69 each with a pronounced rounded point similar to tip segment 64 of wing panel 12.

Referring now to FIGS. 9-12, there is shown a modification of the invention wherein the respective head and neck plates 26 and 36 and the respective cable ties 32 and 42 are replaced by a head cap 72 and a neck cap 74 to provide a rotor 11' that operates in the same manner as rotor 11 of FIGS. 1-8. The head cap 72 has a plurality of inwardly projecting resilient tabs 76 for engaging the slots 30 of the previously described fin panels 12. Within the head cap 72 is a depending lip 78 having a hexagonal shape cooperating with the hexagonal sidewall 83 of this cap so as to define six internal linear channels 79 one adjacent to the other. Channels 79 receive and engage the distal ends of respective fin head segments 27 as the resilient tabs 76 snap into the head section slots 30. The top wall 81 of the cap 72 is preferably thickened around hole 80 to provide a depending convex surface 85 for providing minimal contact with the upstanding convex surface 91 of pole cap 87 for rotatably mounting rotor 11' on the distal end of support pole 17 so that rotor 11' will spin freely and with a pronounced wobble. The upper surface 85 of head cap 72 preferably has a convex shape and is provided with a plurality of facets 86 that scatter light, either natural of artificial, so as to cause a visual sparkling appearance similar to a diamond ring, thereby further enhancing the visual effects produced by rotation of the rotor 11'. The pole cap 87 is preferably made of a slightly elastic plastic material and sized to fit snuggly onto the distal end of the pole 17. Its snug fit and elasticity will keep pole cap 87 securely in place on the pole, while allowing removal of the cap for storage or pole replacement. Alternatively, pole cap 87 may be permanently adhered, as by an adhesive, to the distal end of the pole 17.

The head cap 72 has a hole 80 for receiving either the previously described securing screw 31, or a pair of toothed resilient prongs 82, 82 on a modified pole cap 87, to provide a connection means for rotatably connecting the rotor to the distal end of the support pole. Thus, in place of using the previously described pole cap 46 and the attachment screw 31, the modified pole cap 87 is provided with a pair of upwardly projecting, finger-like prongs 82, 82 each having a laterally projecting tooth 84 tapered outward from top to bottom. The tapered teeth 84, 84 permit cap 72 to slide easily down over the prongs, but having a lateral underside surface preventing removal of cap 72 unless the prongs 82,82 are pinched together to disengage the underside of teeth 84,84 from the upper surface 85 of the head cap.

The need for a rotor attachment screw may thereby be avoided by the rotary mounting structure shown and described as part of the second embodiment of the invention. As seen in this embodiment, the mounting cap on the support pole is provided with an integral self-locking type of connector having two resilient fingers that project upward from the cap's upper convex surface and pass through the hole in the rotor head cap (or alternatively the aperture in the rotor head plate 26) so as to extend along the rotational axis of the rotor. The fingers are shaped and positioned to be pinched together for insertion through the hole and to spring apart after insertion to prevent reverse passage back through the hole. These finger-like tabs may have enlarged tips for easy hand gripping and one or more lateral teeth, the undersides of which engage the outer rim around the hole to positively prevent reverse passage unless the fingers are pinched together by sufficient force to overcome the spring force of their resilience. The resilient fingers therefore allow the rotor assemblies 11 or 11' (or rotor assembly 111 described below) to be detachably mounted more easily on the support pole.

The neck cap 74 has features similar to those of the head cap 72, the principal difference being that it has an opening forming a passage 88 for receiving pole 17 instead of the screw or prong hole 80. Thus, neck cap 74 includes a plurality of inwardly projecting resilient tabs 90 for engaging neck segment slots 40. Within the neck cap 74 is an upstanding lip 92 having a hexagonal shape cooperating with the hexagonal sidewall 100 of this cap so as to define six internal linear channels 93 one adjacent to the other. Channels 93 receive and engage the distal ends of respective fin neck segments 35 as the resilient tabs 90 snap into the neck section slots 40. For economy of manufacture, ears for engaging the rims of head slots 30 and neck slots 40 may be omitted respectively from head cap tabs 76 and neck cap tabs 90. As a further alternative, the head and neck caps may be provided with slots in place of the respective tabs 76 and 90, and the head slots 30 and neck slots 40 may be replaced by outwardly projecting resilient tabs for respectively snapping into and engaging the head cap and neck cap slots.

Thus, in this second rotor embodiment, the head cap channels are shaped to snugly receive a corresponding one of the distal head segment ends of the fin panels, and the neck cap channels are shaped to snugly receive a corresponding one of the distal neck segment ends of the fin panels. The plurality of radially inwardly projecting prongs on the inside of the outer wall of each of these caps extend beyond the inner cap lip, and each of these prongs is positioned and arranged to snap into the corresponding prong slot in the fin panel. The head cap thereby securely fastens together the head segments of the fin panels and the neck cap thereby securely fastens together the neck segments of the fin panels.

The bottom wall 95 of neck cap 74 is preferably thickened around pole passage 88 so as to increase the depth of the passage surface 96, which may be provided with ribs 97 to increase the rubbing action between the wall of the pole passage and the outer surface of pole 17. Although ribs 97 are illustrated as being oriented horizontally, they may instead be oriented vertically or diagonally. Similarly, the thickness of the neck plate 36 of FIGS. 4-5 may be increased to increase the depth of the surface of pole opening 37 so that this surface also may be provided with ribs similar to ribs 97 or with vertical or diagonal ribs. The bottom outer surface 98 of neck cap 74 also may be provided with light scattering facets, such as facets 99. In addition, light scattering facets may also be provided on the sidewall surface 83 of head cap 72 and on sidewall surface 100 of neck cap 74.

Referring now to FIGS. 17 and 18, there is shown a bird repeller assembly, generally designated 102, comprising a plurality of fin panels, generally designated 120, which when assembled form a rotor 111 having a hollow inner barrel, generally designated 114, and a plurality of outwardly projecting fins, generally designated 115. In this third modification of the rotor structure, the respective head and neck plates 26 and 36 and the respective cable ties 32 and 42 of the first embodiment are replaced by a head cap 172 and a neck cap 174 to provide a rotor 111 that operates in the same manner as rotor 11 of FIGS. 1-8. The rotor 111 is made up of five (5) identical linear fin panels individually designated as 120A, 120B, 120C, 120D and 120E in FIG. 18. The rotor 111 is assembled from the individual fin panels as described below, one of these panels being shown in its entirety in FIG. 19.

After assembly, the rotor is rotationally mounted on an elongated supporting member, such as pole or standard 104, having its proximate end slip fitted within a coupling 105 mounted on a plate 106 secured by four screws 107 to a metal or wood support, such as the piling P or the boards of dock D shown in FIG. 1 or some other structure that may be land based or floating on a body of water. Pole 104 optionally may be assembled from smaller segments, such as 104A and 104B, that are detachable connected by a coupling 108 and therefore can be disassembled for shipment. As may be seen best in FIG. 18, the rotor barrel 114 comprises a head section 124, a neck section 134, and a central acoustic section 119 having a plurality of vent openings as exemplified by openings 125A and 125E shown in FIGS. 17 and 18. Each of these vents is formed by a cutout located in the inner barrel portion 113 of a corresponding fin panel as illustrated best by cutout 126A in panel 120A as shown in FIG. 19.

As may be seen in FIG. 17, the fin panels intersect with each other at an acute angle that forms a pocket for catching a wind current produced by the prevailing wind. The wind current provides an air flow over the outwardly projecting fins 115 of the fin panels, which causes the rotor to rotate in the direction of arrow R in FIG. 17 due to the cupping action provided by the pockets as they face upwind. The fin panels 115 of FIGS. 17-19 are preferably stamped or cut out from sheets of clear (i.e. colorless), UV resistant, transparent plastic material. It is also contemplated that the rotor of this and the other embodiments may be made with more or less fin panels.

Figure 19:
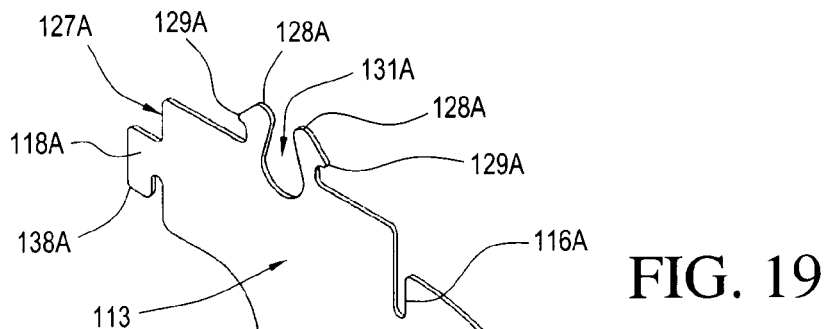
FIG. 19 is an elevational perspective view showing one of the fin components according to the embodiment of FIG. 17.

The individual fin panels 120A-120E are fitted and held together by corresponding upper and lower dog leg fin tabs having inward facing ears (e.g. 138A and 139A in FIG. 19) that snap over and engage the bottom rim of upper and lower fin slots (e.g. 116A and 117A in FIG. 19). Thus, the fin tabs on each fin panel snap into and engage corresponding slots on an adjacent fin panel to thereby lock the fin panels together. By way of example, as may be seen best in FIG. 17, fin tabs 118A, 121A, 118B, 121B, 118C and 121C snap respectively into fin slots 116E, 117E, 116A, 117A, 116B and 117B. This assembly of the fin panels forms the barrel 114, the central section 119 of which supports outwardly projecting fins 115. The barrel 114 also has a head section 124 formed by head segments of the corresponding fin panels, and a neck section 134 formed by neck segments of the corresponding fin panels.

Each of the head segments (e.g. 127A) has a pair of resilient head tabs (e.g. 128A, 128A), the resiliency of which is enhanced by a cutout (e.g. 131A) as shown in FIG. 19. This figure also shows that each of the neck segments (e.g. 135A) has a pair of resilient neck tabs (e.g. 136A, 136A), the resiliency of which is enhanced by a cutout (e.g. 142A).

After the rotor barrel 114 is assembled, the head segments of the fin panels are secured together by a head cap 172 to form a rotor head 170. For this purpose, the head cap has corresponding slots 130A-130E (FIGS. 20 and 21) for receiving and being engaged by the corresponding tabs on the rotor head section 124, which thus has five pairs of head tabs, each pair being carried by a corresponding one of the fin panels. For example, head cap slot 130A is engaged by head tabs 128A, 128A on panel 120A, and head cap slot 130B is engaged by head tabs 128B, 128B on panel 120B as shown in FIG. 17. When each of the head tab pairs has been forced through and thereby engage their corresponding head slot, a depending pentagonal flange 160 of head cap 172 fits snugly over the head section 124 of rotor barrel 114.

Before or after the head cap is secured to the rotor barrel 114, the neck segments of the fin panels are secured together by a neck cap 174 to form a rotor neck 175. For this purpose, the neck cap 174 has corresponding slots 140A-140E (FIG. 22) for receiving and being engaged by corresponding tabs on the rotor neck section 134, which thus has five pairs of neck tabs, each pair being carried by a corresponding one of the fin panels. For example, neck cap slot 140A is engaged by neck tabs 136A, 136A on panel 120A, and neck cap slot 140B is engaged by neck tabs 136B, 136B on panel 120B as shown in FIG. 17. When each of the neck tab pairs has been forced through and thereby engage their corresponding neck slot, upstanding pentagonal flange 149 of neck cap 174 fits snugly over the neck section 134 of rotor barrel 114.

Integrally formed at the outer (lower) end of neck cap 174 is a collar 176 having an opening 177 into a cylindrical passage 178 for receiving therethrough a distal end portion of the pole 104. On the inner end of cap 174 is an upstanding flange 149 for receiving the head section 124 of barrel 114. Each of the head tabs and each of the neck tabs has a corresponding ear (e.g. 129A, 129A and 137A, 137A) on the outside edge thereof for engaging adjacent edges of the rim of the corresponding slot in the head cap 172 or neck cap 174, respectively, upon being forced therethrough by compressing the ears, which are resilient. These prong-like head and neck tabs function like the prongs 82,82 and tapered teeth 84, 84 of the embodiment of FIGS. 9-12 in that they permit the head cap 172 and neck cap 174 to slide easily down over the tabs, but have tooth-like ears, the lateral underside surface of which prevent removal of the caps unless each of the tab pairs are pinched together to disengage their undersides from the edges of their corresponding slot.

Figure 20:
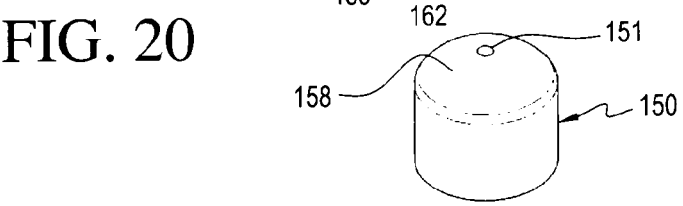
FIG. 20 is an exploded top perspective view of the head cap and pole cap components of the embodiment of FIG. 17.
Figures 21, 22:
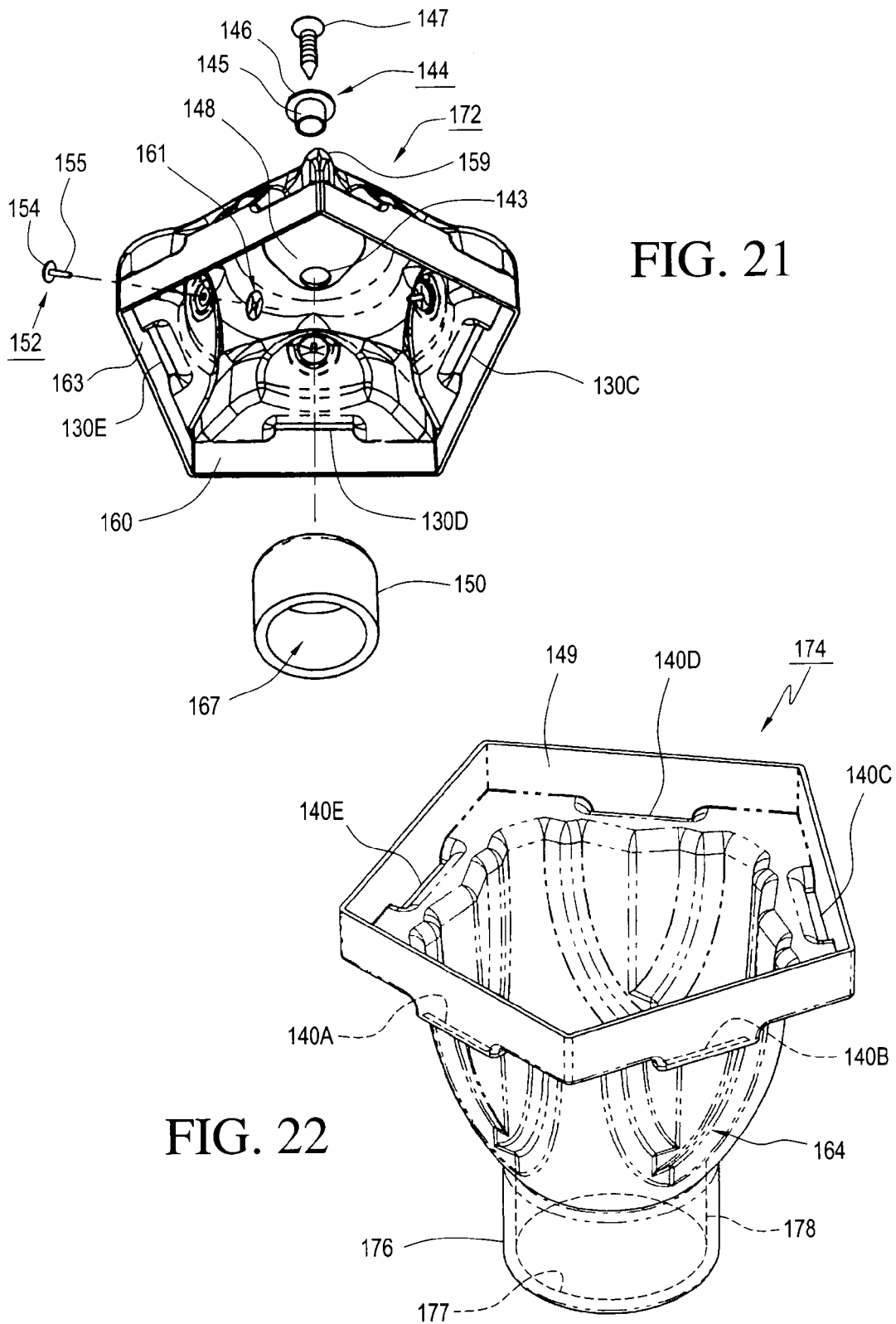
FIG. 21 is an exploded bottom perspective view of the head cap and pole cap components of the embodiment of FIG. 17; and, FIG. 22 is a top perspective view of the neck cap component of the embodiment of FIG. 17.

As best shown in FIGS. 20 and 21, the head cap 172 has an aperture 143 for receiving a bushing 144 and a threaded screw 147 for securing rotor 111 to a pole cap 150 slip fitted on or adhered to the top of the pole 104. Aperture 143 is at the bottom of a concave central depression 165 in the upper surface of head cap 172. A shaft 145 of bushing 144 passes through the aperture 143 and a flange 146 at the outer end of the bushing is positioned to engage an underlying surface of depression 165. This underlying surface may optionally be a ledge (not shown) around the aperture 143 formed by a step in the concave surface of depression 165. The concave shape of depression 165 provides a convex central surface 148 on the underside of cap 172 (FIG. 21). The assembled rotor is mounted on the fixed vertical support pole 104 by securing the head cap 172 to the top of pole cap 150 with stainless steel or plastic screw 147 that enters pole cap aperture 151 after passing through the bushing 144, which is preferable made of a frictionless plastic and serves as the rotor bearing. Pole cap 150 is slip fitted on or adhesively adhered to the distal head portion of the pole and has a convex outer top surface 158 such that this rotary connection allows the rotor to rotate and wobble freely around the head portion of the pole for the reasons previously described for rotors 11 and 11'.

A gap (e.g. 0.25 inches) is provided between the side surface of the pole and the surface of the neck collar passage 178 when the axis of the pole is centered in the passage. This gap and the convex central surface 148 on the underside of the head cap serve the same purposes as previously described for the convex surface 89 and the gap between pole and neck cap shown in FIG. 10. Thus, in addition to the whirring sound provided by the rotor vent openings, the wall of neck collar passage 178 rubs against the adjacent pole surface and the entire rotor 111 wobbles and vibrates against the vertically mounted pole 104. As may be seen best in FIG. 21, the depth of aperture 143 is shallow relative to the length of bushing shaft 145 so as not to interfere with this wobbling motion and also to permit some up and down (reciprocal) motion of head cap 172 relative to pole cap 150.

An important feature of the rotor 111 is that the fin portion 115 of the fin panels 120 is shaped like the wing of a bird of prey, such as a hawk or owl. To further enhance this bird of prey effect, this wing shape includes four tapered wing tip segments 166, 167, and 168, each with a pronounced rounded point similar to the wing tip segments of FIG. 8, to resemble the shape of the feathers of a hawk or owl. It has been found that these tapered wing tip segments provide a more pronounced flashing effect by reflecting light onto surrounding and adjacent surfaces of the rotor, and a more pronounced distortion effect of holographic/diffractive designs on decals (e.g. decals 56-59 of FIGS. 13-16) applied to pole 104, the because of their sharp taper.

To further enhance the bird of prey effect, holographic/diffractive designs are molded into the head cap 172 and the neck cap 174 as shown in FIGS. 17-18 and 20-22. As shown best in FIG. 20, each of the five sides of head cap 172 has concentric ridges and valleys depicting an eye socket 157 and traversing between each pair of the sides are lines and shapes depicting the beak 159 of a hawk or owl. In addition, each eye socket is provided with an eye piece 152 having a mounting pin 155 and an eye design 154, which may be holographic and/or diffractive. Each eye is secured in its corresponding socket by passing the pin 155, which preferably is made of plastic, through a hole 156 at the bottom of the socket until the eye is seated, and then locking the eye in position by engaging the pin with a locking disk 161 (FIG. 21), which preferably is made of metal and has small tines for biting into the plastic pin. As shown best in FIGS. 17, 18 and 22, each of the five sides of neck cap 174 has ridges and valleys 164 depicting the legs and/or talons of a bird of prey.

It is further contemplated by the present invention that the components of the rotors 11, 11' and 111 may be arranged and shipped to users in the form of a kit having a plastic tray with separate compartments for each of these components. The compartments may have shapes that conform to the shapes of the components. The kit for the first embodiment of FIGS. 1-6 may comprise the fin panels 12A, 12B, 12C, 12D, 12E and 12F, the respective head and neck plates 26 and 36, the respective head and neck ties 32 and 42, the respective head and neck decals 52 and 54, the post decal 56, the post cap 45, and the rotor to post connection screw 31 and washer 44.

In the kit for the second embodiment, the head cap 72, the neck cap 74, and the post cap 87 would be substituted respectively for the head plate 26, the neck plate 36, and the post cap 45. In the kit for the third embodiment, the head cap 172, the neck cap 174, and the post cap 150 would be substituted respectively for the head plate 26, the neck plate 36, and the post cap 45. These kits may also contain relatively short pole segments, such as segments 17A and 17B illustrated in FIG. 1 or segments 104A and 104B illustrated in FIG. 18, that may be easily assembled by the user into a longer pole. In addition, the kit preferably contains written instructions for assembling the components of the corresponding rotor and for rotatably mounting the assembled rotor on the supporting pole. These instructions may also advise the user that a satisfactory pole and/or couplings, such as one or more segments of ¾ inch PVC pipe and corresponding pipe couplings, may be obtained from a local hardware store if attachable pole segments are omitted from the kit or if a continuous or longer pole is desired.

The curved panels 112A-F of FIG. 7 may be provided in place of the flat (linear) panels 12A-F or 120A-E; and one or more of the panels 12A-F, 120A-E and 112A-F may have one or more of the special panel features shown in FIG. 8, and described above with reference to this figure. The bottom of the tray compartments for the panels 12A-F or 120A-E may be flat, and the bottom of the tray compartments for the panels 112A-F may be curved to match the fin curvature. All of the tray compartments may have a peripheral wall conforming closely to the periphery of the corresponding component so that the components fit snugly therein.

While specific bird repeller assemblies and methods for manufacturing and assembling their components have been described and illustrated in detail, it will be apparent to those skilled in the art that many modifications and variations are possible without deviating from the broad scope of the present invention. For example, other types of rotary connections may be used to mount the head of the rotor on the distal end of the support pole. Also, the rotor and the pole may be made of a variety of materials, and the neck, barrel and head sections and the fins, vents, tabs and tab slots may have a wide variety of shapes and sizes. Thus, the specific embodiment described herein is for the purpose of illustrating the present invention, and persons skilled in the art will recognize variations thereof that fall within the scope of this invention, which is limited only by the claims appended hereto, and the equivalence of the features described therein.

What is claimed is:

1. A method of making a repeller assembly for repelling birds from a selected area, said method comprising steps of:
   providing a plurality of fin panels that fit together to form a rotor comprising a hollow barrel with vent openings, and fins protruding outwardly from said barrel, each of said panels comprising a fin segment, a barrel segment, a head segment and a neck segment;
   connecting said fin panels together by panel connection means so that said head segments form a rotor head section, said barrel segments form a barrel section with an acoustic chamber, and said neck segments form a rotor neck section, said panel connection means being formed by inserting at least one tab projecting from each of said panels or a member connected thereto into a corresponding slot or recess in an adjacent panel or member connected thereto;
   providing an elongated support member adapted to be fixed within the selected area and having a distal end portion;
   inserting said distal end portion of the support member into said rotor barrel through an opening in said neck section; and, rotatably mounting said rotor on said support member by rotary means rotatably connecting said head section to a distal end of said distal end portion, wherein said vent openings are arranged relative to said fins such that an air flow against said fins flows through said vents and causes rotation of said rotor, said rotation generating bird repelling noises and visual effects.

2. The method of claim 1 further comprising steps of wrapping a head strap around the outside of said head segments and wrapping a neck strap around the outside of said neck segments.

3. The method according to claim 1, wherein said panel connection means is formed by inserting a projecting panel tab on the barrel segment of each panel into a corresponding slot or recess in the barrel segment of an adjacent panel to form said rotor barrel.

4. The method of claim 1, wherein said panel connection means comprises a head member and head connection means for connecting together the head segments of said panels to form a rotor head section, wherein said panel connection means further comprises a neck member and neck connection means for connecting together the neck segments of said panels to form a rotor neck section, wherein said head connection means is formed by inserting a projecting head tab on one of said head segment and head member into a head slot or recess on the other of said head segment and head member for receiving said head tab, and wherein said neck connection means is formed by inserting a projecting neck tab on one of said neck segment and neck member into a neck slot or recess on the other of said neck segment and neck member for receiving said neck tab.

5. The method according to claim 4, wherein said projecting head tab is shaped to snap within a shape of said head slot or recess, and wherein said projecting neck tab is shaped to snap within a shape of said neck slot or recess.

6. The method according to claim 1, wherein said fin panels are made of a transparent material, and wherein said method further comprises arranging a graphic design on said support member to be viewed through at least one of said transparent panels so that rotation of said rotor produces a bird scaring image by distorting said graphic design.

7. A repeller apparatus for repelling birds from a selected area, said apparatus comprising:

a plurality of fin panels that fit together to form a rotor comprising a hollow barrel with vent openings, and fins protruding outwardly from said barrel, each of said panels comprising a fin segment, a barrel segment, a head segment and a neck segment;

at least one tab projecting from each of said panels or a member connected thereto, said tab being received in a corresponding slot or recess in an adjacent panel or member connected thereto for connecting said fin panels together so that said head segments form a head section, said barrel segments form a barrel section with an acoustic chamber, and said neck segments form a neck section; and rotary means for rotatably mounting said rotor on an elongated support member fixed within the selected area and having a distal end portion, said rotary means comprising a mounting member adapted to be mounted on said distal end portion and rotatably connected to said head section, wherein said neck section provides an opening for inserting said distal end portion of the support member into said rotor barrel, and wherein said vent openings are arranged relative to said fin segments such that an air flow against said fin segments flows through said vents and causes rotation of said rotor, said rotation generating bird repelling noises and visual effects.

8. The apparatus according to claim 7, wherein said fin panels are connected together by at least one tab on the barrel segment of each panel that passes into a corresponding slot or recess in the barrel segment of an adjacent panel to form said barrel section, and wherein each of said head segments is connected to a head member and each of said neck segments is connected to a neck member by at least one tab that passes into a corresponding slot or recess.

9. The apparatus of claim 7, wherein said projecting panel tab is shaped to snap within a shape of said corresponding slot or recess.

10. A repeller apparatus for repelling birds from a selected area, said apparatus comprising:

a plurality of fin panels that fit together to form a rotor comprising a hollow barrel with vent openings, and fins protruding outwardly from said barrel, each of said panels comprising a fin segment, a barrel segment, a head segment and a neck segment, and said barrel segments of the fin panels forming an acoustic chamber within said hollow barrel;

a head member and head connection means for connecting said head member to the head segment of each of said fin panels to form a rotor head section;

a neck member and neck connection means for connecting said neck member to the neck segment of each of said fin panels to form a rotor neck section; and, rotary means for rotatably mounting said rotor on an elongated support member fixed within the selected area and having a distal end portion, said rotary means comprising a mounting member adapted to be mounted on said distal end portion and rotatably connected to said head member, wherein said neck member has an opening for inserting said distal end portion of the support member into said rotor barrel, wherein said vent openings are arranged relative to said fin segments such that an air flow against said fin segments flows through said vents and causes rotation of said rotor, said rotation generating bird repelling noises and visual effects, and wherein said head connection means comprises a head strap wrapped around the outside of said head segments, and wherein said neck connection means comprises a neck strap wrapped around the outside of said neck segments.

11. A repeller apparatus for repelling birds from a selected area, said apparatus comprising:

a plurality of fin panels that fit together to form a rotor comprising a hollow rotor barrel with vent openings, and fins protruding outwardly from said barrel, each of said panels comprising a fin segment, a barrel segment, a head segment and a neck segment;

panel connection means for connecting said fin panels together so that said head segments form a rotor head section, said barrel segments form a barrel section with an acoustic chamber, and said neck segments form a rotor neck section, said panel connection means comprising a tab projecting from each of said panels or a member connected thereto, and said tab being received in a corresponding slot or recess in an adjacent panel or member connected thereto; and, rotary means for rotatably mounting said rotor on an elongated support member fixed within the selected area and having a distal end portion, said rotary means comprising a mounting member adapted to be mounted on said distal end portion and rotatably connected to said head section;

said neck segment providing an opening for insertion of said distal end portion of the support member into said rotor barrel;

and said vent openings being arranged relative to said fin segments such that an air flow against said fin segments flows through said vents and causes rotation of said rotor, said rotation generating bird repelling noises and visual effects.

12. The apparatus of claim 11, wherein said panel connection means comprises a head member and a head tab on one of said head segment and said head member and a head slot or recess on the other of said head segment and said head member for receiving said head tab.

13. The apparatus of claim 11, wherein said panel connection means comprises a neck member and a neck tab on one of said neck segment and said neck member and a neck slot or recess on the other of said neck segment and said neck member for receiving said neck tab.

14. The apparatus according to claim 11, and wherein said panel connection means comprises a head member and a head tab on one of said head segment and said head member and a head slot or recess on the other of said head segment and said head member for receiving said head tab, and wherein said head member and said neck member are respectively a head cap and a neck cap, said head cap being sized and shaped to fit over each of said head segments, and said neck cap being sized and shaped to fit over each of said neck segments.

15. The apparatus according to claim 14, wherein an outer surface of said head cap and an outer surface of said neck cap each have a plurality of facets for reflecting or distorting light.

16. The apparatus of claim 11, wherein said tab projects from the barrel segment of each fin panel and is received in said corresponding slot or recess of the barrel segment of an adjacent fin panel.

17. The apparatus according to claim 11, wherein said projecting panel tab is shaped to snap within a shape of said corresponding slot or recess.

18. The apparatus of claim 11, wherein said panel connection means further comprises a neck strap wrapped around the outside of said neck segments.

19. The apparatus according to claim 18, wherein said neck strap is an elongated decal strip having a graphic design of a bird scaring image.

20. The apparatus of claim 11, wherein said panel connection means further comprises a head strap wrapped around the outside of said head segments.

21. The apparatus according to claim 20, wherein said head strap is an elongated decal strip having a graphic design of a bird scaring image.

22. The apparatus according to claim 11, wherein said fin panels are made of a transparent material, and wherein said apparatus further comprises a graphic design arranged on said support member to be viewed through said transparent panels so that rotation of said rotor produces a bird scaring image by visually distorting said graphic design.

23. The apparatus according to claim 11, wherein there are at least three of said fin panels and each of said fin panels provides a corresponding vent opening.

24. The apparatus according to claim 11, wherein said panel connection means comprises a head member and a head tab on one of said head segment and said head member and a head slot or recess on the other of said head segment and said head member for receiving said head tab; and wherein said rotary means comprises a rotor mounting cap for attachment to the distal end portion of said support member, an axial shaft element having a fixed end rigidly fixed to said mounting cap and a free end for projecting upwardly through an aperture in said head member, and engagement means for providing a detachable snap-action engagement between the free end of said shaft element and a rim of said aperture to secure said head member to said mounting cap.

25. The apparatus according to claim 11, wherein said panel connection means comprises a neck member and a neck tab on one of said neck segment and said neck member and a neck slot or recess on the other of said neck segment and said neck member for receiving said neck tab, and wherein a round ball member is arranged within said rotor neck section to roll along an inner surface of said neck member and thereby produce a bird repelling noise in response to rotation of said rotor.

26. The apparatus according to claim 11, wherein said panel connection means comprises a head member, a neck member and at least one tab on each fin panel that is received in a slot of an adjacent fin panel to form said rotor barrel section, and wherein each of said head segments is connected to said head member and each of said neck segments is connected to said neck member by a tab that is received in a slot.

* * * * *